US 6,507,589 B1

(12) United States Patent
Ramasubramani et al.

(10) Patent No.: US 6,507,589 B1
(45) Date of Patent: Jan. 14, 2003

(54) METHOD AND APPARATUS FOR ROUTING BETWEEN NETWORK GATEWAYS AND SERVICE CENTERS

(75) Inventors: Seetharaman Ramasubramani, San Jose, CA (US); Stephen S. Boyle, Fremont, CA (US); Mark A. Fox, San Mateo, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/131,491

(22) Filed: Aug. 10, 1998

Related U.S. Application Data

(63) Continuation-in-part of application No. 09/070,668, filed on Apr. 30, 1998, now Pat. No. 6,314,108.

(51) Int. Cl.[7] .............................................. H04L 12/46
(52) U.S. Cl. ...................................... 370/465; 370/401
(58) Field of Search ................................ 370/329, 465, 370/405, 401; 379/114; 705/11

(56) References Cited

U.S. PATENT DOCUMENTS

| | | | | |
|---|---|---|---|---|
| 5,473,602 A | * | 12/1995 | McKenna et al. | 370/329 |
| 5,673,322 A | | 9/1997 | Brockman et al. | |
| 5,742,905 A | | 4/1998 | Brockman et al. | |
| 5,764,756 A | * | 6/1998 | Onweller | 370/405 |
| 5,799,016 A | * | 8/1998 | Onweller | 370/401 |
| 5,809,415 A | | 9/1998 | Rossmann | |
| 5,845,267 A | * | 12/1998 | Ronen | 379/114 |
| 5,907,610 A | * | 5/1999 | Onweller | 370/405 |
| 5,960,404 A | * | 9/1999 | Chaar et al. | 705/11 |
| 6,189,042 B1 | * | 2/2001 | Keller-Tuberg | 370/405 |

FOREIGN PATENT DOCUMENTS

WO    97 41654 A    11/1997

OTHER PUBLICATIONS

Sietmann, R, "Mobil INS Internet, Wireless Application Protocol Adaptiert Mobiltelefone Fuer Das WWW", CT Magazin Fuer Computer Technik, No. 4, Jan. 1, 1998, pp. 202–207.

Kreller, B. et al., "UMTS: A Middleware Architecture and Mobile API Approach", IEEE Personal Communications, vol. 5, No. 2, Apr. 1, 1998.

Hild, S.G. et al., "Mobilizing Applications", IEEE Personal Communications, vol. 4, No. 5, Oct. 1997.

(List continued on next page.)

*Primary Examiner*—Salvatore Cangialosi
(74) *Attorney, Agent, or Firm*—Beyer Weaver & Thomas, LLP

(57) ABSTRACT

Techniques for routing messages to addressable portions (e.g., processes) within an apparatus are disclosed. The techniques can be performed by a variety of apparatus including, for example, a gateway, a proxy server or a mobile device. After receiving the messages routed thereto, the addressable portions are able to process the messages and perhaps return a reply message. Often, the apparatus is a gateway or proxy server coupled between a network containing remote computers storing information and a wireless communication system including a plurality of mobile devices. The processing of the message will typically act to produce a message that forwards certain of the information from one or more of the remote computers on the network to a mobile device coupled to the wireless communication system.

45 Claims, 24 Drawing Sheets

OTHER PUBLICATIONS

Fujino N. et al., "Mobile Information Service Based on Multi–Agent Architecture", IEICE Transactions on Communications, vol. E80–B, No. 10, Oct. 1997.

Wu, C–S. et al., "Internet Access for Personal Mobile Equipments in a Wireless WAN Environment", IEEE Transactions on Consumer Electronics, vol. 43, No. 3, Jun. 1997.

Fielding et al., "Hypertext Transfer Protocol—HTTP/1.1", Internet–Draft HTTP Working Group, Aug. 1996.

"Smart Messaging Specification", Nokia Mobile Phones Ltd., Sep. 15, 1997.

HDML 2.0 Language Reference, Version 2.0, Unwired Planet, Inc. Software Developer Kit, Jul. 1997.

"HDTP Specification", Version 1.1–Draft, Unwired Planet, Inc. Jul. 15, 1997.

* cited by examiner

| Airlink ID | Carrier Name | Network Type | Carrier Transport ID | Narrowband Router Address | ENABLE |
|---|---|---|---|---|---|
| 0001 | ATT | CDPD | UDP | | Y |
| 0002 | Qualcomm | SMS-1/CDMA | SMPP | | Y |
| 0003 | Sprint | SMS-1/CDMA | EIP | | N |
| 0004 | Telia | SMS-1/GSM | CMG | | Y |
| ... | ... | ... | ... | ... | |

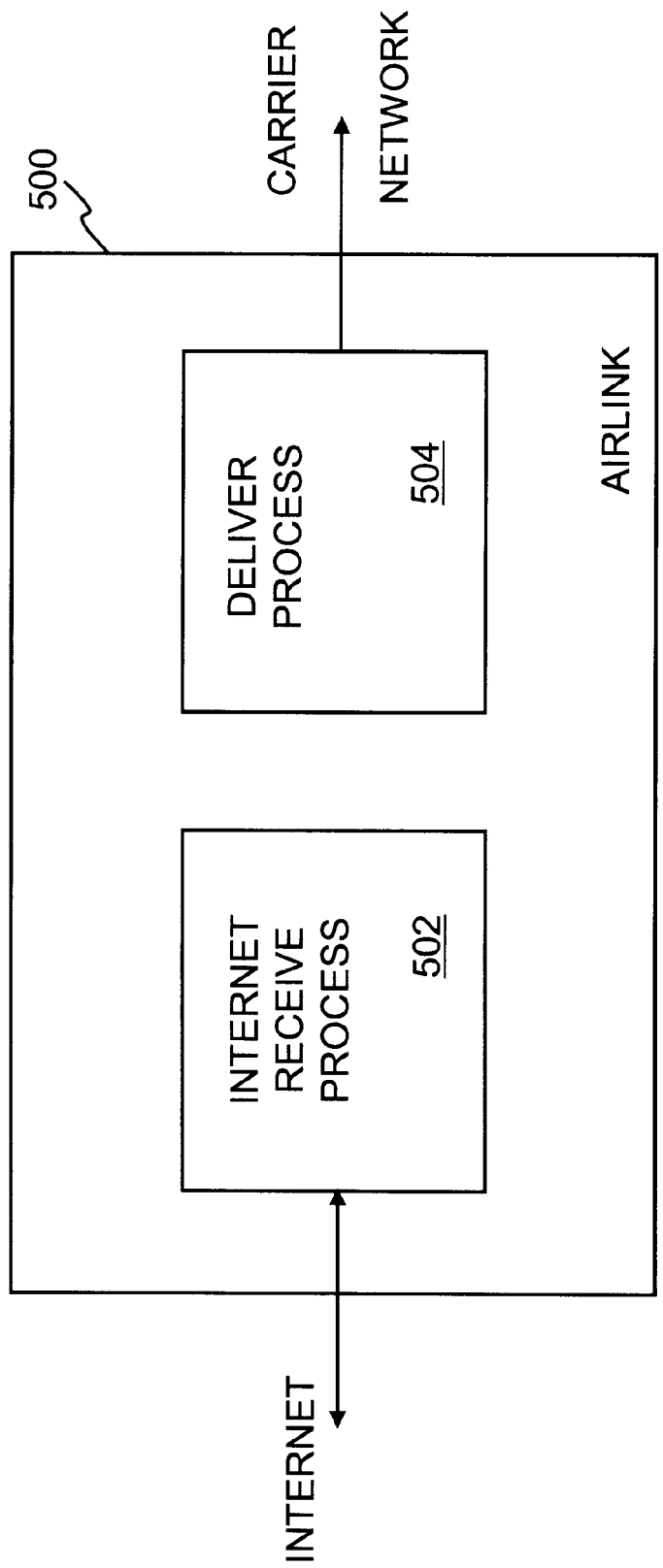

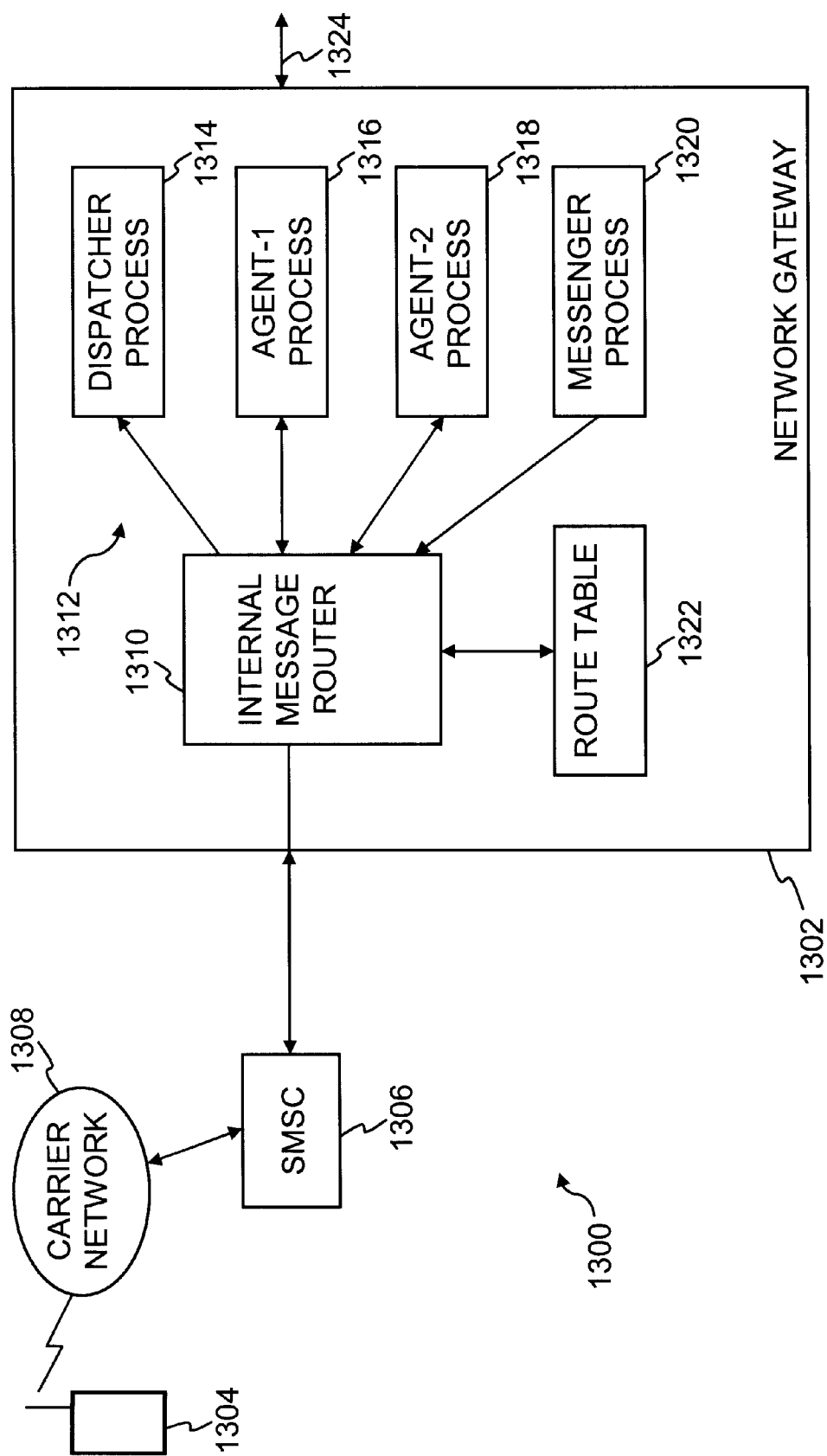

METHOD AND APPARATUS FOR ROUTING BETWEEN NETWORK GATEWAYS AND SERVICE CENTERS

CROSS-REFERENCE TO RELATED APPLICATION

This application is a continuation-in-part of U.S. Application Ser. No. 09/070,668, filed Apr. 30, 1998, and entitled "METHOD AND APPARATUS FOR PROVIDING NETWORK ACCESS OVER DIFFERENT WIRELESS NETWORKS", which is hereby incorporated by referenced, now U.S. Pat. No. 6,314,108.

BACKGROUND OF THE INVENTION

1. Field of the Invention

The present invention relates to wireless networks, and more particularly, to providing network access over different networks.

2. Description of the Related Art

The tremendous growth of the Internet in recent years has fueled the need to provide wireless devices such as mobile telephones, personal digital assistants (PDAs) and the like with access to information and services available on the Internet. However, providing wireless devices with access to the Internet is complicated by the fact that various different carrier networks with different wireless network characteristics are used domestically and world wide to communicate with the wireless devices. Examples of wireless networks include Cellular Digital Packet Data (CDPD), Global System for Mobile Communications (GSM), Code Division Multiple Access (CDMA) and Time Division Multiple Access (TDMA) to name a few, and each of these wireless networks has different data transfer characteristics such as latency, bandwidth, protocols and connection methods. As examples, protocols can be Internet Protocol (IP), Short Messaging System (SMS) and Unstructured Supplementary Service Data (USSD), and connection methods can include packet switched or circuit switched.

FIG. 1 is a block diagram of a conventional communication system 100 suitable for coupling a mobile communication device to the Internet. Specifically, the communication system 100 includes a mobile communication device 102 that couples through a carrier network 104 to a network gateway 106. The network gateway 106 facilitates the coupling of the mobile communication device 102 with the Internet 108. As is common, various computer systems including computers supporting application server A 110 and application server B 112 are coupled to or form part of the Internet 108. The primary function of the network gateway 106 is to receive data requests from the carrier network 104 and convert them into Hyper Text Transfer Protocol (HTTP) requests for use with the Internet 108. Likewise, the network gateway 106 also receives HTTP responses from the Internet 108 and converts them to data responses with a format (e.g., protocol) suitable for use with the carrier network 104.

Conventionally, the network gateway 106 is able to couple a single carrier network 104 to the Internet 108. In such cases, the network gateway 106 is specifically designed and constructed for the particular type of network and its protocols used by the carrier network 104. The network gateway 106 thus provides the various mobile communication devices utilizing the carrier network 104 with Internet access.

However, in the wireless communication world, particularly with mobile telephones, there are a wide variety of carrier networks that are used to provide telephone and data transmission services to mobile telephones. These various carrier networks often have different network types as well as different protocols for transporting data. Hence, the construction of a network gateway for use with one particular carrier network often means that the same network gateway will not support other carrier networks. Consequently, a particular carrier network will need its own network gateway to facilitate the coupling of its associated mobile communication devices with the Internet.

Such limitations are particularly problematic in the case in which a company has several carrier networks that are used to support its various subscribers having mobile communication devices. In such a case, the company will require multiple network gateways in order to couple the various carrier networks to the Internet. Each of these network gateways will be constructed somewhat differently to accommodate the wireless characteristics of the particular carrier network. Besides the general burden of providing multiple network gateways, there are other disadvantages of such an approach. One such disadvantage is that by requiring different carrier networks or information providers to provide their own gateway network is not only an inefficient use of resources but also complicates the management and servicing requirements. Another disadvantage of using multiple network gateways to support the different carrier networks is that software development costs substantially increase.

Besides the problem of using multiple network gateways, another problem is that often narrowband wireless networks are used for the communications between mobile communication devices and the Internet. These narrowband wireless networks have limited bandwidth and have normally been used only for one-way communications. However, with multiple network gateways that are scaleable, there is a need for techniques that direct incoming messages to different parts of the multiple network gateway so that messages from different mobile communication devices or wireless networks can be processed differently. It would also be advantageous to carry out two-way communications over these narrowband wireless networks.

Thus, there is a need for improved ways to couple carrier networks to the Internet in an efficient and cost effective way.

SUMMARY OF THE INVENTION

Broadly speaking, the invention relates to techniques for routing messages to addressable portions (e.g., processes) within an apparatus. The techniques can be performed by a variety of apparatus including, for example, a gateway, a proxy server or a mobile device. After receiving the messages routed thereto, the addressable portions are able to process the messages and perhaps return a reply message. Often, the apparatus is a gateway or proxy server coupled between a network containing remote computers storing information and a wireless communication system including a plurality of mobile devices. The processing of the message will typically act to produce a message that forwards certain of the information from one or more of the remote computers on the network to a mobile device coupled to the wireless communication system.

The invention is particularly well suited for directing incoming messages to different parts of a multiple network gateway so that messages from different mobile devices or wireless communication system can be processed differently. With the invention, a narrowband wireless network can be used to provide two-way communications between the mobile devices and the network.

The invention can be implemented in numerous ways, including as a method, an apparatus, a computer readable medium, and a computer system. Several embodiments of the invention are discussed below.

As method for routing messages to one of a plurality of addressable portions within a gateway that couples to a network, an embodiment of the invention includes the acts of: receiving, at the gateway, a message from a mobile device, the message including a header portion and a data portion, the header portion including a destination port identifier and a source port identifier, the source port identifier identifies a port within the mobile device, and the destination port identifier identifies a port within the gateway; obtaining the destination port identifier from the message; and routing the message to a particular one of the addressable portions within the gateway that is associated with the port identified by the destination port number.

As an apparatus that provides mobile devices with access to a network, one embodiment of the invention includes a plurality of processes that process messages directed to the network, and an internal message router. Each of the messages includes a destination port identifier, a source port identifier and a data portion. For a particular message, the source port identifier identifies a port within a mobile device that sent the particular message to the apparatus, and the destination port identifier identifies a port within the apparatus where the particular message is to be processed. The internal message router receives incoming messages and routes the messages to the ports associated with the processes that are to process the messages. The routing of the messages is done based on the destination port identifiers within the messages.

As a computer readable medium containing computer program code for routing messages to one of a plurality of processes or entities within an apparatus that couples to a network, an embodiment of the invention includes: computer program code for receiving at the apparatus a message from a mobile device, the message including a header portion and a data portion, the header portion including a destination port identifier and a source port identifier, the source port identifier identifies a port within the mobile device, and the destination port identifier identifies a port within the apparatus; computer program code for obtaining the destination port identifier from the message; and computer program code for routing the message to a particular one of the processes or entities within the apparatus As a system for delivery of information from a network of computers to wireless communication devices, an embodiment of the invention includes: a plurality of wireless communication devices, the wireless communications devices including a processing unit and a display screen; a plurality of wireless network carriers, each of the wireless network carriers providing wireless communication services to the plurality of wireless communication devices, and a plurality of the wireless network carriers using a different combination of network type and transport protocol; a network of computers, one or more of the computers of the network of computers contains information; and a multi-network gateway. The multi-network gateway couples the wireless network carriers to the network of computers to facilitate data transfer therebetween, each of the plurality of the wireless network carriers using a different combination of network type and protocol are coupled to the network of computers by a network driver configured for the particular combination of network type and protocol, and each of the network drivers operate to exchange data with certain of the wireless communication devices via the wireless network carriers associated therewith. The multi-network gateway includes at least a plurality of processes and an internal message router. The plurality of processes operate to process messages directed to the network. Each of the messages includes a destination port identifier, a source port identifier and a data portion. For a particular message, the source port identifier identifies a port within a wireless communication device that sent the particular message to the apparatus and the destination port identifier identifies a port within the apparatus where the particular message is to be processed. The internal message router receives incoming messages and routes the messages to the ports associated with the processes that are to process the messages, the routing being based on the destination port identifiers within the messages that identify the ports associated with the processes.

As a method for registering a process with an internal message router of a network gateway within a communication system, the network gateway providing wireless communication devices with access to a network, an embodiment of the invention includes the acts of: sending a registration request to the internal message router when a process within the network gateway capable of be routed to by the internal message router is activated; processing the registration request at the internal message router to assign a port number for the process; and returning the assigned port number to the process.

The advantages of the invention are numerous. One advantage of the invention is that each process within a gateway is able to be separately addressable. Another advantage of the invention is that messages are able to be routed between a process in a mobile device and a process in the gateway. At the gateway then, a message can be routed to the appropriate process within the gateway that is to process the message. Still another advantage of the invention is that a scaleable multiple network gateway supporting different wireless networks is facilitated by the improved ability to route messages. Yet another advantage of the invention is that it facilitates scaleable two-way communications over narrowband networks.

Other aspects and advantages of the invention will become apparent from the following detailed description taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 4 illustrates a representative airlink configuration table according to a representative embodiment of the invention;

FIGS. 5A and 5B are schematic diagrams of airlinks according to an embodiment of the invention;

FIG. 13 is a block diagram of a communication system according to an embodiment of the invention;

DETAILED DESCRIPTION OF THE INVENTION

One aspect of the invention relates to centralized network access for wireless network carriers providing network access to wireless communication devices. The invention provides a network gateway (or proxy server) that provides access to a network of computers to various wireless network carriers having different wireless network characteristics. In one embodiment, the invention uses airlinks (or network drivers) to support the communications between the network gateway and the various wireless network carriers.

Embodiments of this aspect the invention are discussed below with reference to FIGS. 2–12B. However, those skilled in the art will readily appreciate that the detailed description given herein with respect to these figures is for explanatory purposes as the invention extends beyond these limited embodiments.

Figure 1:
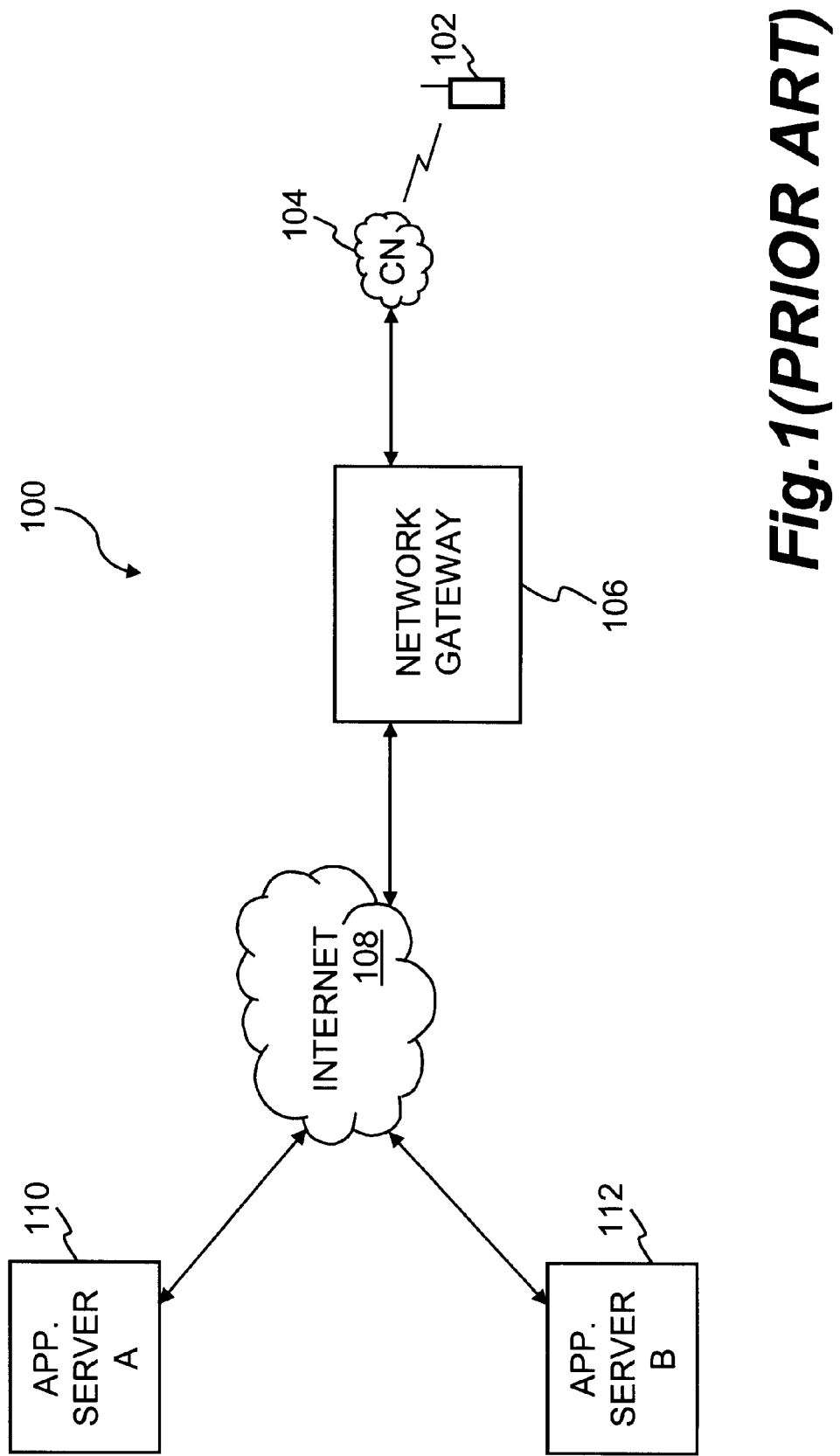
FIG. 1 is a block diagram of a conventional communication system suitable for coupling a mobile communication device to the Internet.
Figure 2:
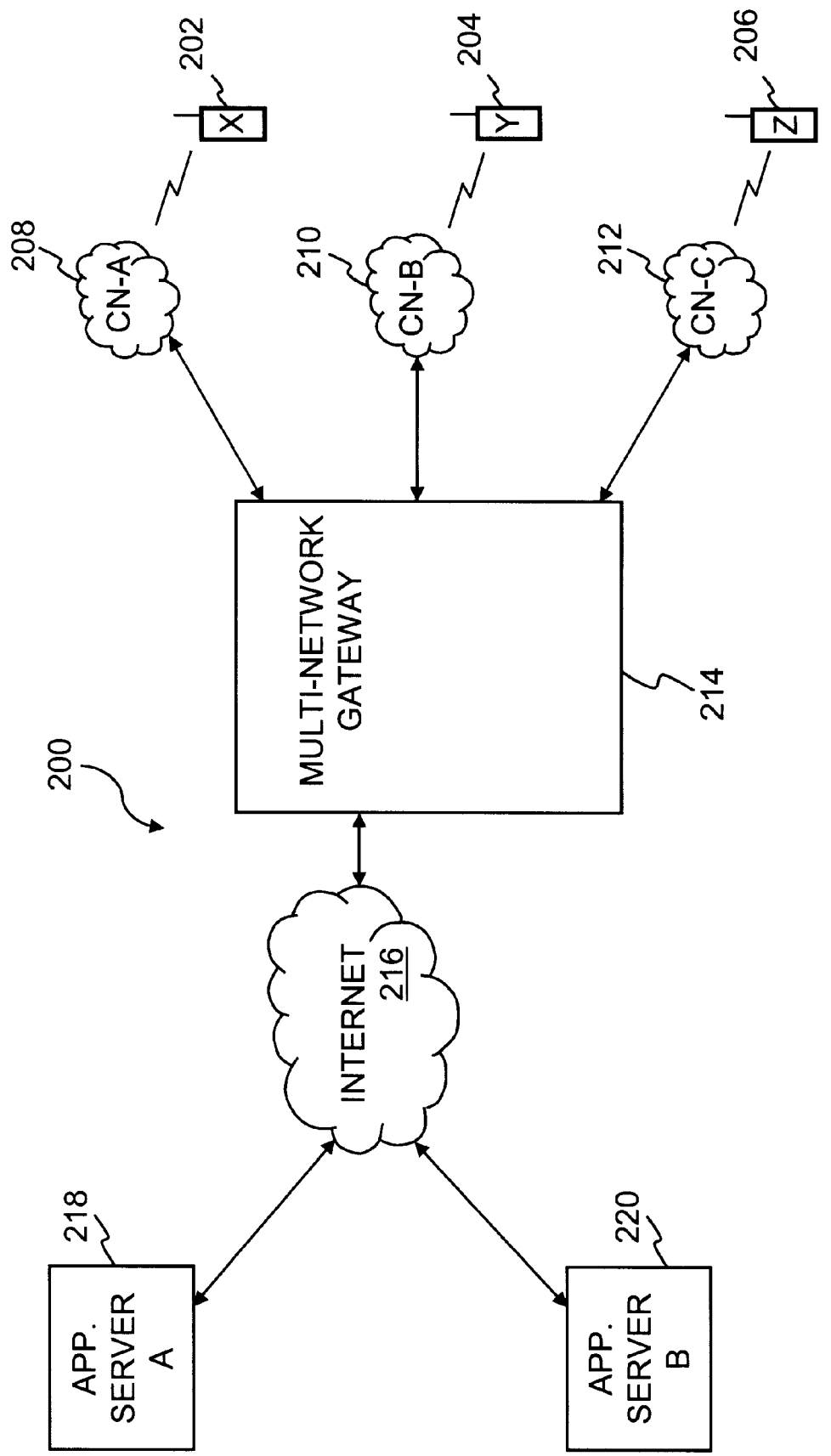
FIG. 2 is a block diagram of a communication system according to a basic embodiment of the invention.

FIG. 2 is a block diagram of a communication system 200 according to a basic embodiment of the invention. The communication system 200 is a wireless communication system that provides Internet access to wireless communication devices 202, 204 and 206. Each of the wireless communication devices 202, 204 and 206 are illustrated as coupling to the communication system 200 through a different carrier network. Specifically, the wireless communication device 202 couples to the Internet via a carrier network A (CN-A) 208, the wireless communication device 204 couples to the Internet via a carrier network B (CN-B) 210, and the wireless communication device 206 couples to the Internet through a carrier network C (CN-C) 212. Each of the carrier networks 208, 210 and 212 can have a different network type as well as use a different protocol. Hence, the communication system 200 is able to support many different wireless carrier networks with a single, or central, multi-network gateway. Given the large number of different wireless carrier networks, the ability to support different carrier networks is an advantage.

The communication system 200 also includes a multi-network gateway 214. The multi-network gateway 214 is able to couple various wireless carrier networks with different network characteristics to the Internet 216. In other words, the communication system 200 enables the wireless communication devices 202, 204 and 206 to access and retrieve information from the Internet via the multi-network gateway 214 regardless of differences in the wireless carrier networks 208, 210 and 212. Hence, even though different wireless carrier networks are coupled to the Internet 216 by the multi-network gateway 214, the ability to access and retrieve information from the Internet 216 is available to each of the wireless communication devices 202, 204 and 206 regardless of the particular wireless carrier network 208, 210 and 212 being utilized.

The wireless communication devices 202, 204 and 206 will often seek to obtain information from application servers located on the Internet 216. FIG. 2 illustrates a representative application server A 218 and a representative application server B 220 of or on the Internet 216. For example, the wireless communication devices 202, 204 and 206 may seek to obtain information from the application server A 218 or the application server B 220 located on the Internet 216. As an example, the application server A 218 can be associated with an e-mail application program that provides e-mail services for wireless communication devices. On the other hand, the application server B 220 can be associated with a stock information service that provides stock update notifications and other stock information to registered subscribers with wireless communication devices.

Although the embodiment of the invention described with reference to FIG. 2 provides access to the Internet, the invention more generally provides access to a network of computers which would include, for example, the Internet and intranets. Moreover, in FIG. 2, the carrier networks A, B and C 208, 210 and 212 are illustrated and it is assumed that each of these carrier networks are different. The carrier networks are different in the type of network they implement and/or in the particular protocols they use. However, it should be understood that nothing prevents the communication system 200 from including certain carrier networks that implement the same network type with the same protocols as other carrier networks within the communication system 200. Still further, although the carrier networks 208, 210 and 212 are illustrated as supporting the wireless communication devices 202, 204 and 206, respectively, it should be understood that normally each of the carrier networks 208, 210 and 212 will support many wireless communication devices.

Figure 3:
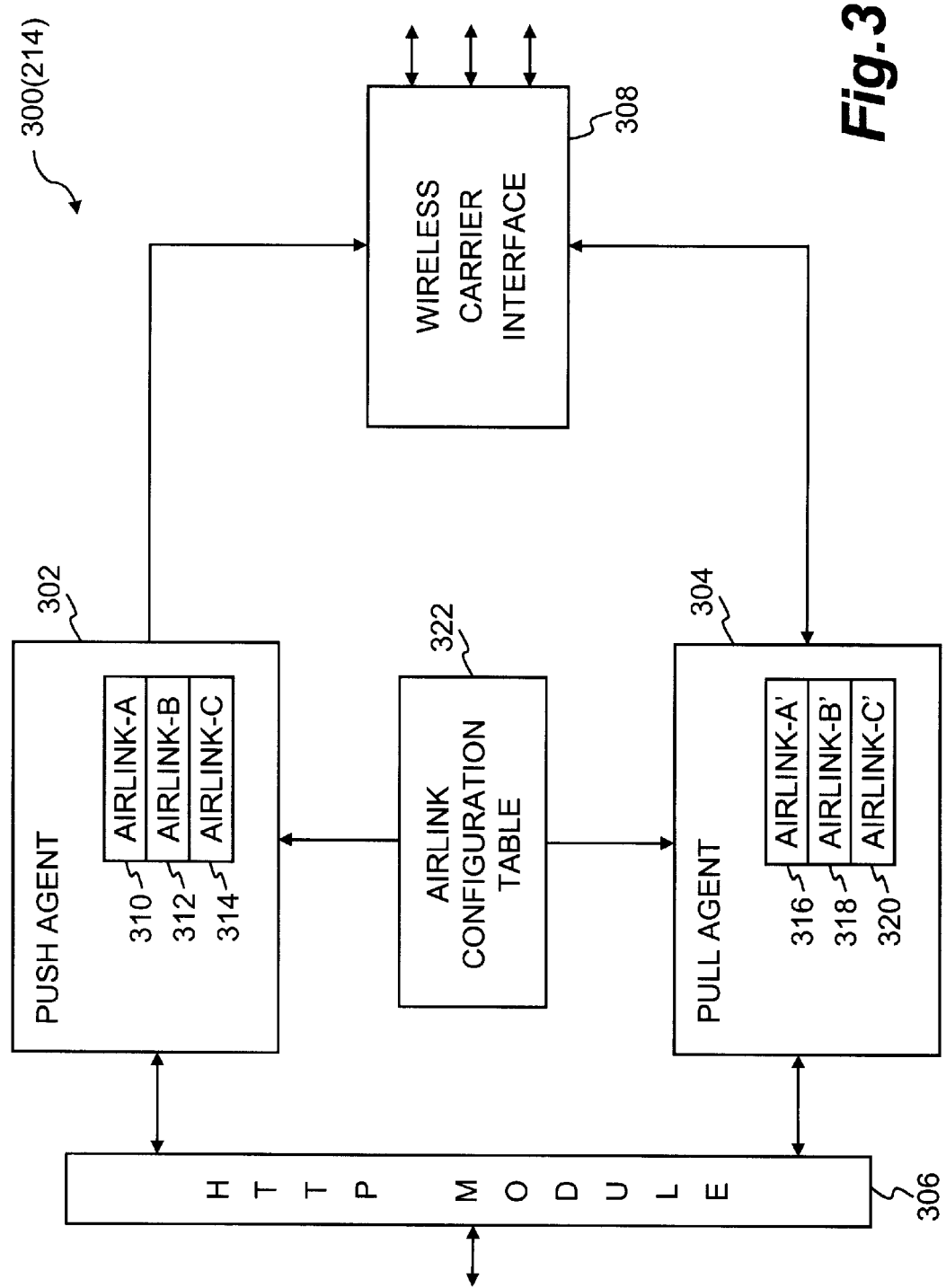
FIG. 3 is a block diagram of a multi-network gateway according to one embodiment of the invention.

FIG. 3 is a block diagram of a multi-network gateway 300 according to one embodiment of the invention. The multi-network gateway 300 is, for example, suitable for use as the multi-network gateway 214 illustrated in FIG. 2. Specifically, the multi-network gateway 300 assumes that the multi-network gateway is facilitating the coupling of three different carrier networks to the Internet. As illustrated in FIG. 2, the three carrier networks are referred to as carrier network A, carrier network B, and carrier network C.

The multi-network gateway 300 includes a push agent 302 and a pull agent 304. The push agent 302 and the pull agent 304 are in general agents or processing modules within the multi-network gateway 300 that serve to provide wireless communication devices with access to information from the Internet 216. The push agent 302 operates to "push" information content from the Internet to the wireless communication devices. The pull agent 304 operates to "pull" information content from the Internet 216 when requested by the wireless communication devices. The push agent 302 and pull agent 304 are coupled to the Internet 216 by an HTTP module 306. Also, the push agent 302 and the pull agent 304 are coupled to the carrier networks A, B and C by a wireless carrier interface 308.

In order for the multi-network gateway 300 to support the various carrier networks, the push agent 302 and the pull agent 304 include airlinks for each of the carrier networks. These airlinks are specialized programming resources that are designed to correspond and interact with the particular wireless network characteristics associated with the corresponding carrier network. The airlinks can also be referred to as network drivers because they are used to communicate with the carrier networks. In any case, the push agent 302 includes an airlink-A 310 for use with the carrier network A, an airlink-B 312 for use with the carrier network B, and an airlink-C 314 for use with the carrier network C. Similarly, the pull agent 304 includes an airlink-A' 316 for use with the carrier network A, an airlink-B' 318 for use with the carrier network B, and an airlink-C' 320 for use with the carrier network C. The corresponding airlinks (e.g., A and A') in the push agent 302 and the pull agent 304 are similar but can differ in certain aspects such as, for example, retry mechanisms or delivery acknowledgments.

The multi-network gateway 300 also includes an airlink configuration table 322. The airlink configuration table 322 contains information regarding the network types and protocols used by the various carrier networks. In this described embodiment, the airlink configuration table 322 contains network types and protocols for the carrier network A, the carrier network B and the carrier network C. The airlink configuration table 332 also includes information identifying the particular airlink to be used in the multi-network gateway 300 for each of the respective carrier networks coupling to the multi-network gateway 300.

FIG. 4 illustrates a representative airlink configuration table 400 according to a representative embodiment of the invention. The airlink configuration table 400 is, for example, suitable for use as the airlink configuration table 332 illustrated in FIG. 3. As illustrated in FIG. 4, the airlink configuration table 400 includes a row entry for each carrier network. For each carrier network, the column entries describe the following characteristics of the carrier network: airlink identifier (ID), carrier name, network type, carrier transport identifier (ID), narrowband router address, and airlink enable. The airlink ID is the unique identifier for a particular airlink used in the multi-network gateway 300. The carrier name is the particular name associated with the carrier network, such as AT&T or Sprint. The network types include, for example, Cellular Digital Packet Data (CDPD) and various types of Short Messaging System (SMS) networks (e.g., SMS-1/CDMA and SMS-1/GSM) or narrowband networks (e.g., Unstructured Supplementary Service Data (USSD)). The carrier transport ID indicates the protocol used by the network, such as User Datagram Protocol (UDP), Short Message Peer-to-peer Protocol (SMPP), EIP or CMG. The narrowband router address provides an address to a suitable narrowband router used in certain embodiments of the multi-network gateway when providing information over a narrowband channel. The airlink enable is used to indicate whether or not a particular airlink should be activated during initialization of the multi-network gateway. As noted in the representative airlink configuration table 400, the airlinks for the AT&T, Qualcomm and Telia networks are enabled and therefore operational, and the airlink for the Sprint network is disabled and therefore not operational. Hence, as an example, the airlinks for the carrier networks A, B and C are denoted in the airlink configuration table 400 by the airlink identifiers 0001, 0002 and 0004, respectively.

Figure 5B:
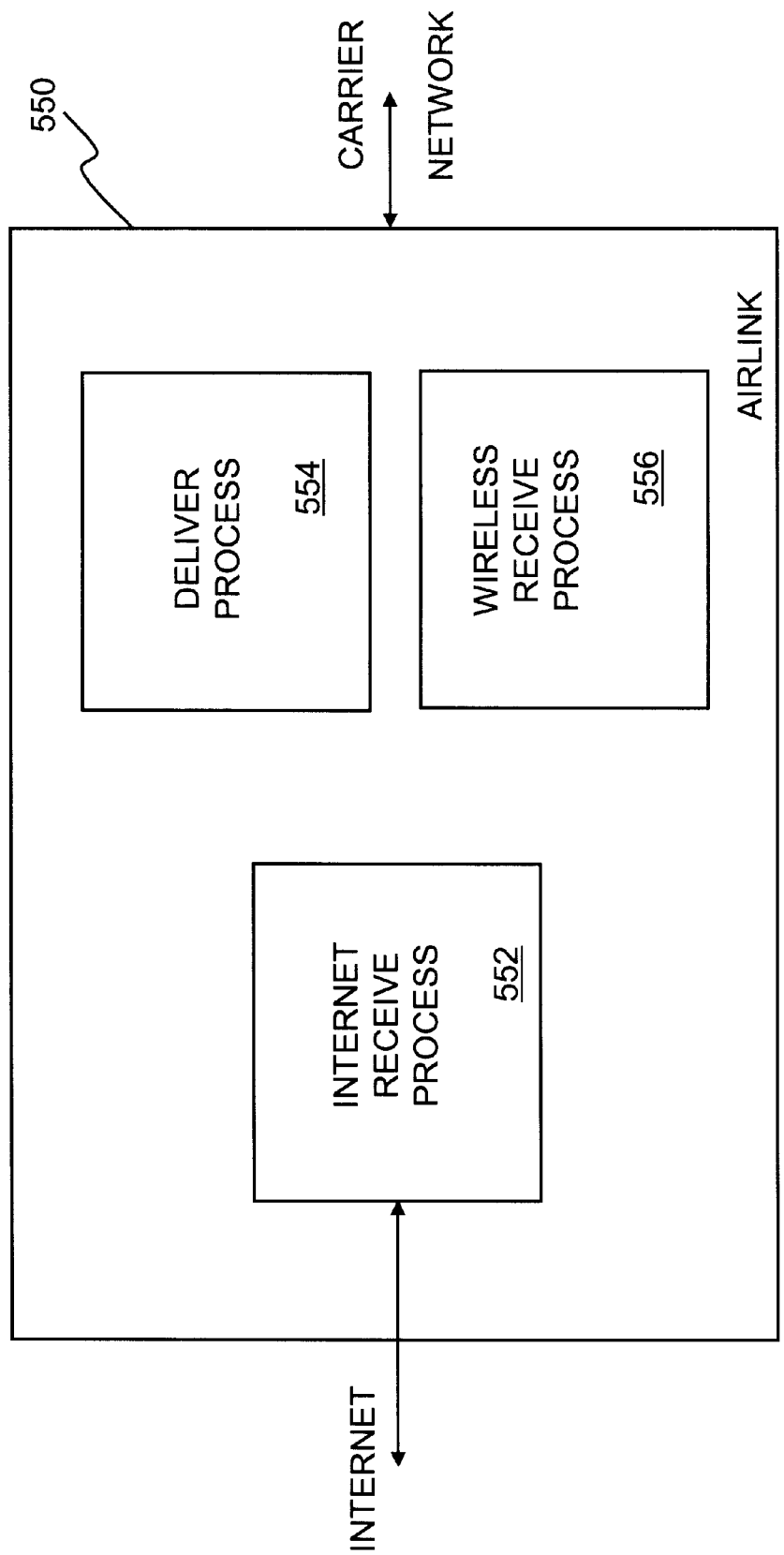

FIGS. 5A and 5B are schematic diagrams of airlinks according to an embodiment of the invention. The airlinks as noted above are network device drivers that facilitate communications with the carrier networks by performing conversions between protocols or other network characteristics. The airlinks are responsible for sending data to or receiving data from the carrier networks.

FIG. 5A illustrates an airlink design 500 suitable for use in a push agent (e.g., the push agent 302). The airlink design 500 includes two specific processes or functions, namely, an Internet receive process 502 and a deliver process 504. The Internet receive process 502 operates to receive a notification from the Internet. After receiving the notification via the Internet receive process 502, the push agent processes the notification to form a Protocol Data Unit (PDU). The push agent also identifies the appropriate deliver process 504 to send the PDU to the target or destination address via the carrier network. In other words, the push agent determines the airlink to be utilized to send the PDU. The PDU can also be referred to as a notification message. Optionally, the deliver process 504 can also wait for an acknowledgment that the notification was received and may also retry the sending as needed.

FIG. 5B illustrates an airlink design 550 suitable for use in a pull agent (e.g., the pull agent 304). The airlink design 550 includes three specific processes or functions, namely, an Internet receive process 552, a deliver process 554, and a wireless receive process 556. The Internet receive process 552 operates to receive a reply from the Internet. The reply from the Internet is in response to a prior request by the pull agent to the Internet. After receiving the reply via the Internet receive process 502, the pull agent processes the reply to form a Protocol Data Unit (PDU). The pull agent also identifies the appropriate deliver process 554 to send the PDU to the target or destination address via the carrier network. In other words, the pull agent will determine the airlink to be utilized to send the PDU. The PDU can also be referred to as a data response. Optionally, the deliver process 554 can also wait for an acknowledgment that the PDU was received and may also retry the sending as needed.

The airlinks can either be for unidirectional use or bi-directional use. For example, the push agent 302 illustrated in FIG. 3 provides only unidirectional transmission from the Internet 216 to the wireless communication devices. Typically, the push agent 302 forwards notifications to certain of the wireless communication devices. Hence, the airlinks 310, 312 and 314 of the push agent 302 would only need to forward notifications from the Internet 216 to the wireless communication devices 202, 204 and 206, and thus would have the airlink design 500 illustrated in FIG. 5A. Hence, within the push agent 302, the Internet receive process 502 would be receiving information from the Internet 216, and the deliver process 504 would send information to the carrier network. On the other hand, the pull agent 304 of the multi-network gateway 300 operates in a bi-directional manner. Therefore, the airlinks 316, 318 and 320 within the pull agent 304 will include deliver and receive processes with respect to the carrier network. The airlinks 316, 318 and 300 would thus have the airlink design 550 illustrated in FIG. 5B. The deliver process supports the transport of information from the pull agent to the wireless communication devices. The wireless receive process 556 supports the reception of information from the wireless communication devices.

Carrier networks are commonly classified into packet-switched networks and circuit-switched networks. In packet-switched networks, communications between the carrier network and the wireless communication device can use Internet Protocol (IP) addressing because the wireless communication device has its own individual IP address. Circuit-switched networks, on the other hand, require the establishment of a circuit with the carrier network before the wireless communication device can communicate with the carrier network. In such networks, the wireless communication devices do not have a static IP address but instead have a dynamically assigned IP address or unique phone numbers. One example of a packet-switched carrier network is CDPD. One example of a circuit-switched network is Code Division Multiple Access (CDMA) and Global System for Mobile communications (GSM).

Figure 6:
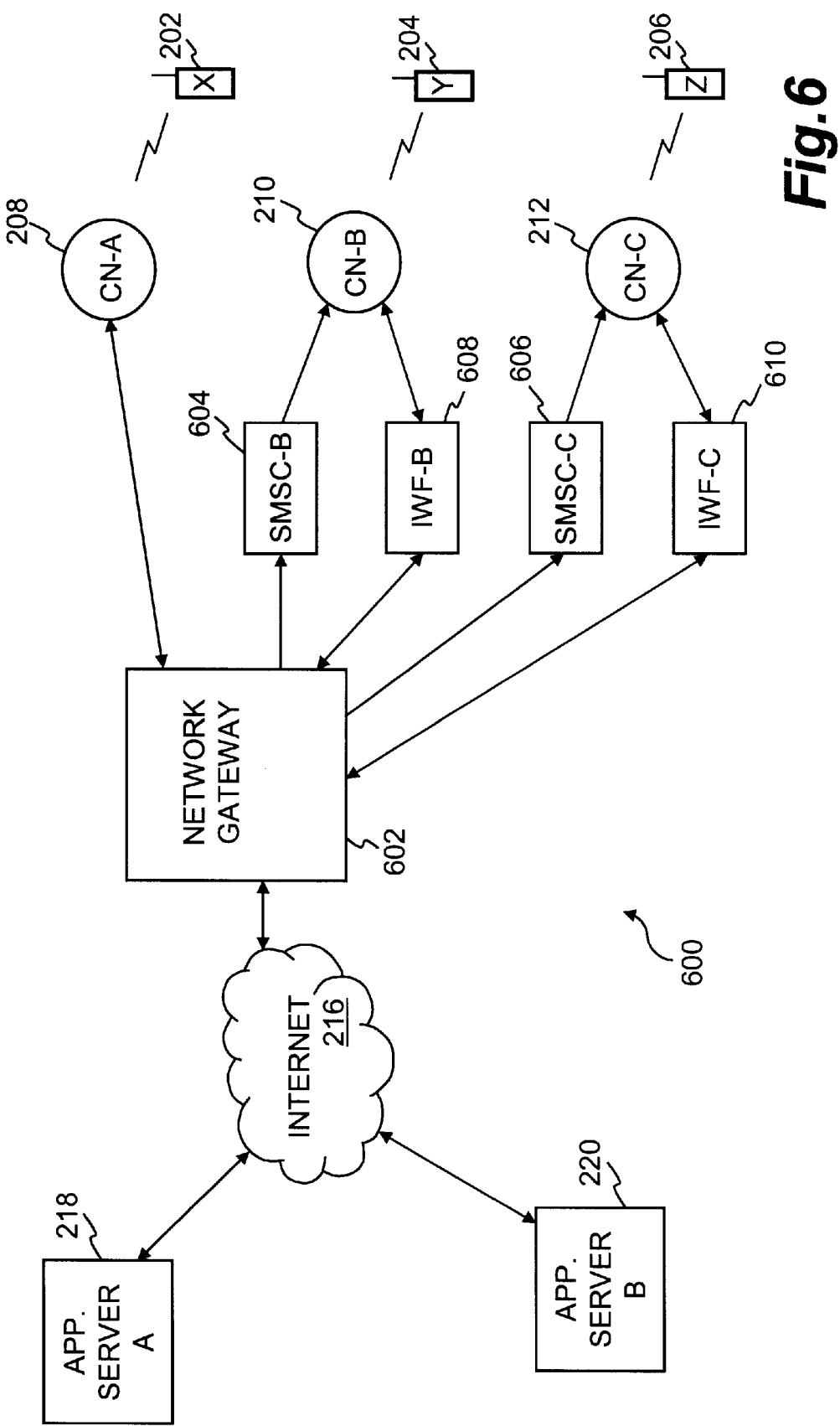
FIG. 6 is a block diagram of a communication system according to an embodiment of the invention.

FIG. 6 is a block diagram of a communication system 600 according to an embodiment of the invention. The communication system 600 includes a network gateway 602 that facilitates access and retrieval of information from the Internet 216 to the wireless communication devices 202, 204 and 206 as did the multi-network gateway 214 illustrated in FIG. 2. The communication system 600, however, specifically pertains to the situation where the carrier network A 208 is a packet-switched network such as CDPD, the carrier network B 210 is a SMS-type network using CDMA with an interface protocol of SMPP, and the carrier network C 212 is another SMS-type network that uses GSM with an interface protocol of UCP.

Since the carrier network B 210 and the carrier network C 212 are circuit-switched networks using SMS, they use Small Message Server Centers (SMSCs) and Inter-Working Functions (IWF) to provide communication with the carrier networks. The use of the SMSCs and the IWFs are conventional and typically provided by the carrier networks so that messaging and interaction can be achieved with the carrier networks. Hence, the communication system 600 includes SMSC-B 604,and SMSC-C 606 which respectively provide message services to wireless communication devices coupled to the carrier network B 210 and the carrier network C 212, respectively. The SMSCs 604 and 606 provide one-way notifications from the multi-network gateway 602 to the wireless communication devices on the carrier network B 210 and the carrier network C 212, respectively. The IWF-B 608 and the IWF-C 610 are respectively used to provide two-way interaction between the network gateway 602 and the carrier network-B 210 and the carrier network-C 212, respectively. The SMSC connections to the carrier networks are typically referred to as narrowband channels, whereas the IWF connections to the carrier networks are wideband channels.

Figure 7:
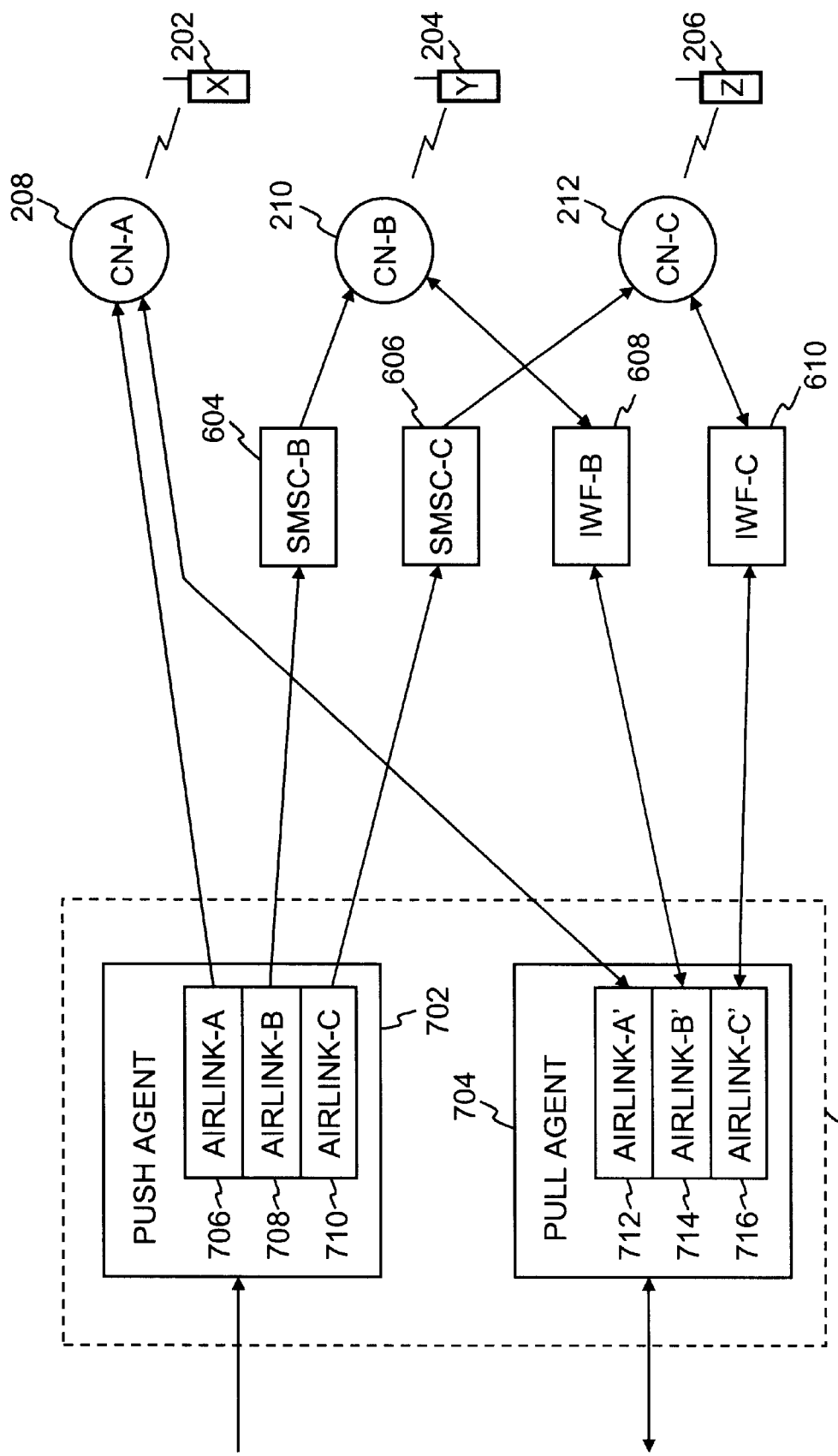
FIG. 7 is a detailed diagram of the network gateway illustrated in FIG. 6.

FIG. 7 is a detailed diagram of the network gateway 602 illustrated in FIG. 6. In particular, the network gateway 602 includes a push agent 702 and a pull agent 704. The push agent 702 is associated with a narrowband channel between the network gateway 602 and the carrier networks B and C 210 and 212. More particularly, the push agent 702 includes a plurality of airlinks that are associated with the carrier networks of the communication system 600. Specifically, the push agent 702 includes an airlink-A 706 for use with the carrier network A 208, an airlink-B 708 for use with the carrier network B 210, and an airlink-C 710 for use with the carrier network C 212. Each of the airlinks 706, 708 and 710 are designed to properly interact with the characteristics of the associated wireless carrier network. The airlink-A 706 is coupled to the carrier network A 208 which is, for example, a CDPD network. The airlink-B 708 is coupled to the carrier network B 210 through the SMSC-B 604 because the carrier network B 210 is a circuit-switched type of network that requires use of an SMSC. Likewise, the airlink-C 710 couples to the carrier network C 212 through the SMSC-C 606 because the carrier network C 212 is also a circuit-switched type of network that requires use of a SMSC. Hence, the push agent 702 is able to "push" a notification triggered by an application server on the Internet 216 to an appropriate one or more of the wireless communication devices 202, 204 and 206.

The push agent 702 is generally used to "push" information from the Internet 216 to the wireless communication devices. The information being pushed is normally a notification (e.g., a message). For example, an e-mail application on the Internet might push a subscriber a notification that they have new e-mail waiting. Another example is a stock application on the Internet that might push a subscriber a notification that they have updated stock information available. If a notification from an application on the Internet 216 is destined for the wireless communication device 202, the notification would be provided to the push agent 702. The push agent 702 then determines that the airlink-A 706 should be used for communicating with the wireless communication device 202. The push agent 702 then directs the notification to the airlink-A 706 which in turn forwards the notification in the suitable format to the carrier network-208. The carrier network A 208 then forwards the notification in a wireless manner to the wireless communication device 202. If a notification from an application on the Internet 216 is destined for the wireless communication device 204, the notification is provided to the push agent 702. The push agent 702 then determines that the airlink-B 708 should be used for communicating with the wireless communication device 204. The push agent 702 then directs the notification to the airlink-B 708 which in turn forwards the notification in the suitable format to the SMSC-B 604. The SMSC-B 604 then forwards the notification to the carrier network B 210 which in turn forwards the notification in a wireless manner to the wireless communication device 204. Similarly, if the notification is destined for the wireless communication device 206, the notification is provided to the push agent 702. The push agent 702 then determines that the airlink-C 710 should be used for communicating with the wireless communication device 206. The push agent 702 then directs the notification to the airlink-C 710 which in turn forwards the notification in the suitable format to the SMSC-C 606. The SMSC-C 606 then forwards the notification on to the carrier network C 212 which then in turn forwards the notification in a wireless manner to the wireless communication device 206.

The pull agent 704 is generally used to "pull" information from the Internet 216 and provide it to the wireless communication devices. The "pulling" of information from the Internet 216 is usually a bi-directional communication using the HTTP protocol at the Internet side and different wireless network characteristics on the carrier network side. Hence, the pull agent 704 performs conversion processing between the HTTP protocol and the various protocols used by the associated wireless carrier networks coupled to the pull agent 704. In this regard, the pull agent 704 includes an airlink for each of the associated carrier networks. The airlink for a particular carrier network performs the conversion between protocols and network types so that information can be properly sent and received over the carrier networks. The airlinks also manage the sending of information from and the receiving of information to the multi-network gateway 602. In particular, the pull agent 704 includes an airlink-A' 712 that is used to send and receive data to and from the carrier network A 208. The pull agent 704 also includes airlink-B' 714 that sends and receives data to and from the carrier network B 210. The pull agent 704 still further includes an airlink-C' 716 that sends and receives information to and from the carrier network C 212. In a described embodiment, the carrier network A 208 is a CDPD type of network, and the carrier network B 210 and the carrier network C 212 are SMS type networks. Hence, the airlink-B' 714 couples to the carrier network B 210 through the IWF-B 608, and the airlink-C' 716 couples to the carrier network C 212 through the IWF-C 610.

Figure 8A:
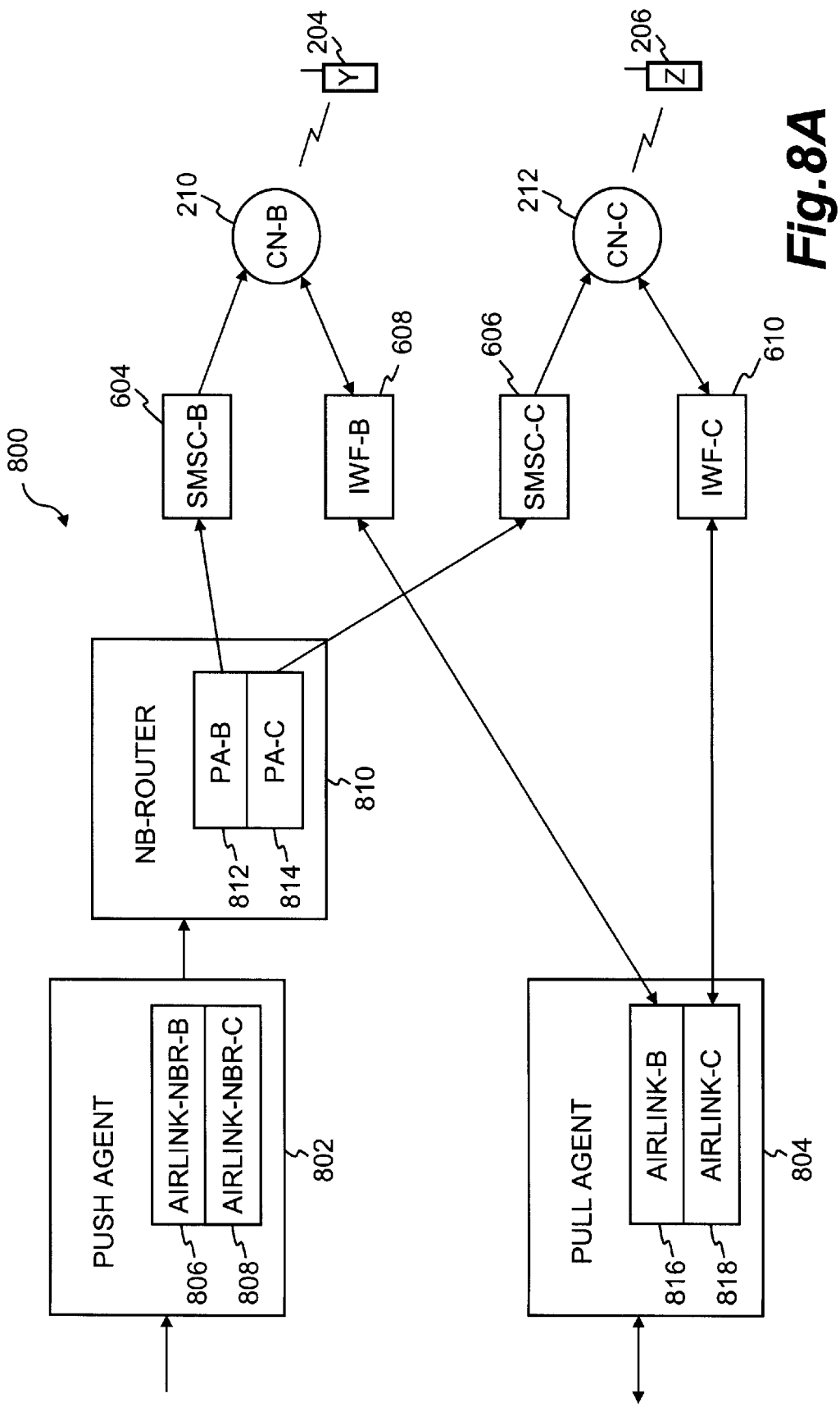
FIG. 8A is a block diagram of a communication system according to another embodiment of the invention.

FIG. 8A is a block diagram of a communication system 800 according to another embodiment of the invention. The communication system 800 illustrates a communication system for use between the Internet 216 and the carrier network B 210 and the carrier network C 212 to provide wireless communication services for wireless communication devices such as the wireless communication device 204 and the wireless communication device 206. Similar to the communication system 600 illustrated in the FIGS. 6 and 7, the communication system 800 includes a push agent 802 and a pull agent 804. The push agent 802 includes airlinks as do previously described embodiments of the invention. However, in this embodiment, the airlinks included in the push agent 802 include an airlink-NBR-B 806 and an airlink-NBR-C 808. These airlinks 806 and 808 send and receive information to and from a narrowband router (NB-router) 810. The NB-router 810 acts as an intermediary between the airlinks 806 and 808 and the SMSC units 604 and 606. The NB-router 810 performs some routing to the appropriate SMSC units 604 and 606 which are associated with the narrowband channel as well as provides protocol adapters for the SMSC units 604 and 606. The NB-router 810 includes protocol adapters that are associated with each SMSC units 604 and 606. For example, the NB-router 810 includes a protocol adapter (PA-B) 812 that provides protocol adaptation to the protocol of the SMSC-B 604 and the protocol adapter PA-C 814 provides protocol adaptation for the protocol used by the SMSC-C 606. The routing performed by the NB-router 810 operates to route messages (information) destined for a particular wireless device on a particular carrier network to the appropriate protocol adapter associated with the appropriate SMSC unit for the particular carrier network. Additionally, the routing performed by the NB-router 810 also operates to route acknowledgments or original requests from a particular wireless device to the appropriate airlink in the pull agent 804. Hence the NB-router 810 off loads the interaction with the SMSC units from the push agent 802. One advantage of this design is that the processing load on the push agent 802 is reduced. Another advantage of this design is that scalability of the multi-network gateway improves with the one or more push agents able to share the capabilities provided by the NB-router 810.

If the agent or agents of the communication system were required to communicate directly with the SMSC (i.e., without the benefit of a NB-router), then the multi-network gateway would need various additional agents to handle increased processing loads. The SMSC units would have to allocate additional endpoint addresses for the additional agents so that mobile originated messages could be properly delivered. Such design would increase the configuration and management complexity both in the multi-network gateway and the SMSC units. Further, the complexity would be increased because the multi-network gateway is capable of supporting multiple SMS interface protocols. Also, with various agents, there would be increased complexity when new SMS interface protocols were to be supported. Hence, by providing the NB-router, the protocols for use with the SMSC units is confined to a single location so that they may be better managed. In other words, the protocol adapters for the SMSC units are centralized in the NB-router. The routing provided by the NB-router is described further below with respect to an internal message router which more generally provides for routing of messages to processes (e.g., agents, airlinks, protocol adapters).

The communication system 800 illustrated in FIG. 8A is referred to as one-way SMS for the narrow band channel together with a separate wide band channel. Two-way SMS may now or in the future become available from some network carriers. Two-way SMS allows bi-directional communications over SMS using a channel with a relatively low bandwidth though likely greater capacity than that provided by one-way SMS.

Figure 8B:
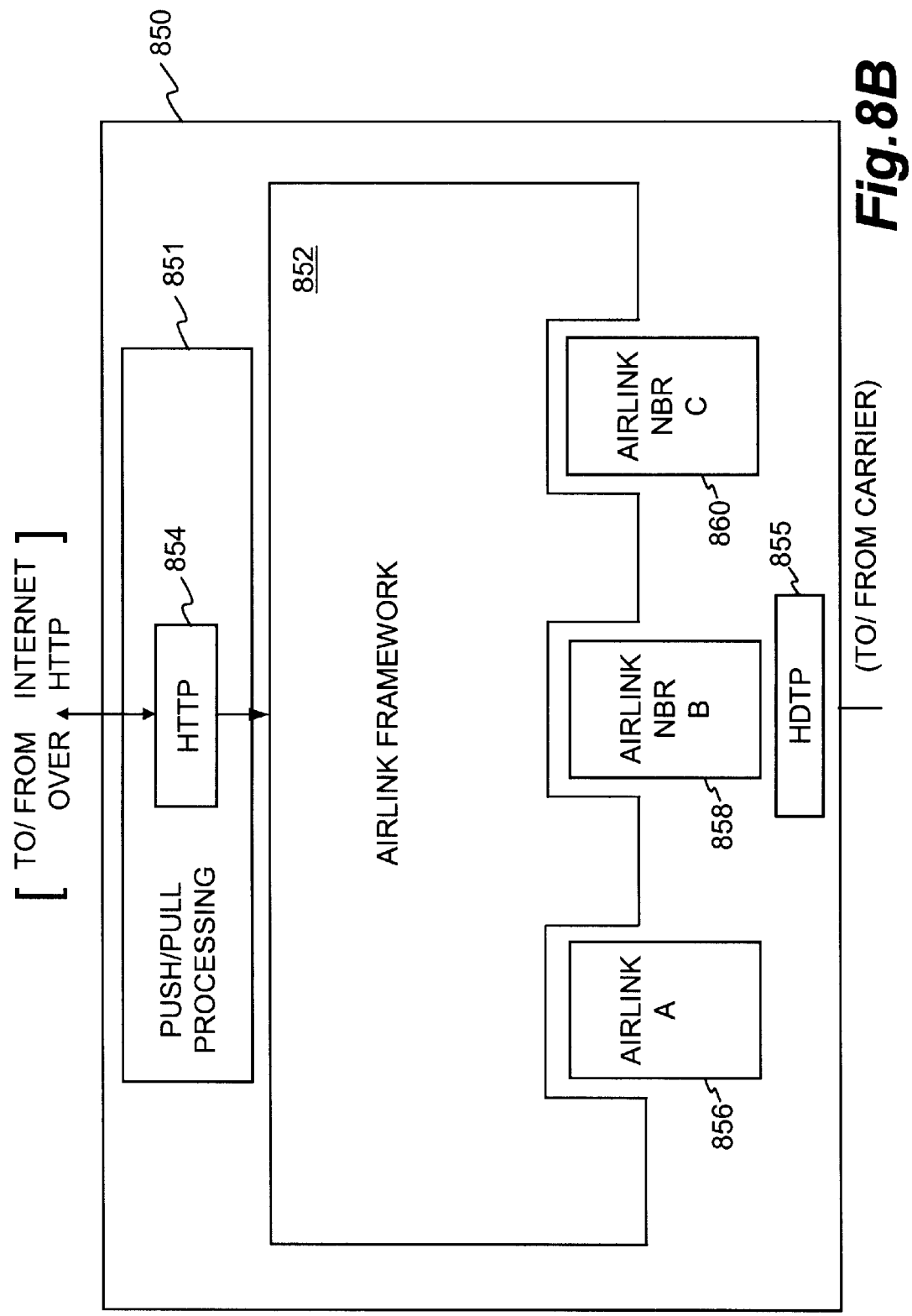
FIG. 8B is a diagram illustrating an airlink framework within a push agent or a pull agent according to an embodiment of the invention.

FIG. 8B is a diagram illustrating an airlink framework within a push agent or a pull agent according to an embodiment of the invention. More specifically, a push or pull agent 850 includes push/pull processing 851 and an airlink framework 852. The airlink framework 852 is, for example, a framework for the airlinks within the push agent 802 or the pull agent 804 of the communication system 800. The airlink framework 852 represents a processing model for the airlinks within the push agent or the pull agent and their interface to the carrier networks. As illustrated, the airlink framework 852 can communicate with an application server on the Internet 216 using an HTTP interface 854. The push/pull processing 851 is also able to communicate with carrier networks via a Handheld Device Transport Protocol (HDTP) interface 855 which can operate with User Datagram Protocol (UDP) and interact with a Handheld Device Markup Language (HDML) browser in the wireless communication device. The airlink framework 852 includes airlinks for the various carrier networks having different network types and/or protocols. Namely, with respect to FIGS. 7 and 8A, the airlinks plugged-into the airlink framework 852 include airlink A 856, airlink-NBR-B 858, and airlink-NBR-C 860. The airlink A 856, airlink-NBR-B 858 and airlink-NBR-C 860 can respectively correspond to the airlinks A, B and C 706, 708 and 710 or the airlinks 712, 714 and 716 in FIG. 7. More particularly, since the airlinks 858 and 860 are for a NB-router, the airlink-NBR-B 858 and the airlink-NBR-C 860 can respectively correspond to the airlink-NBR-B 806 and the airlink NBR-C 808 in FIG. 8A.

Figure 9:
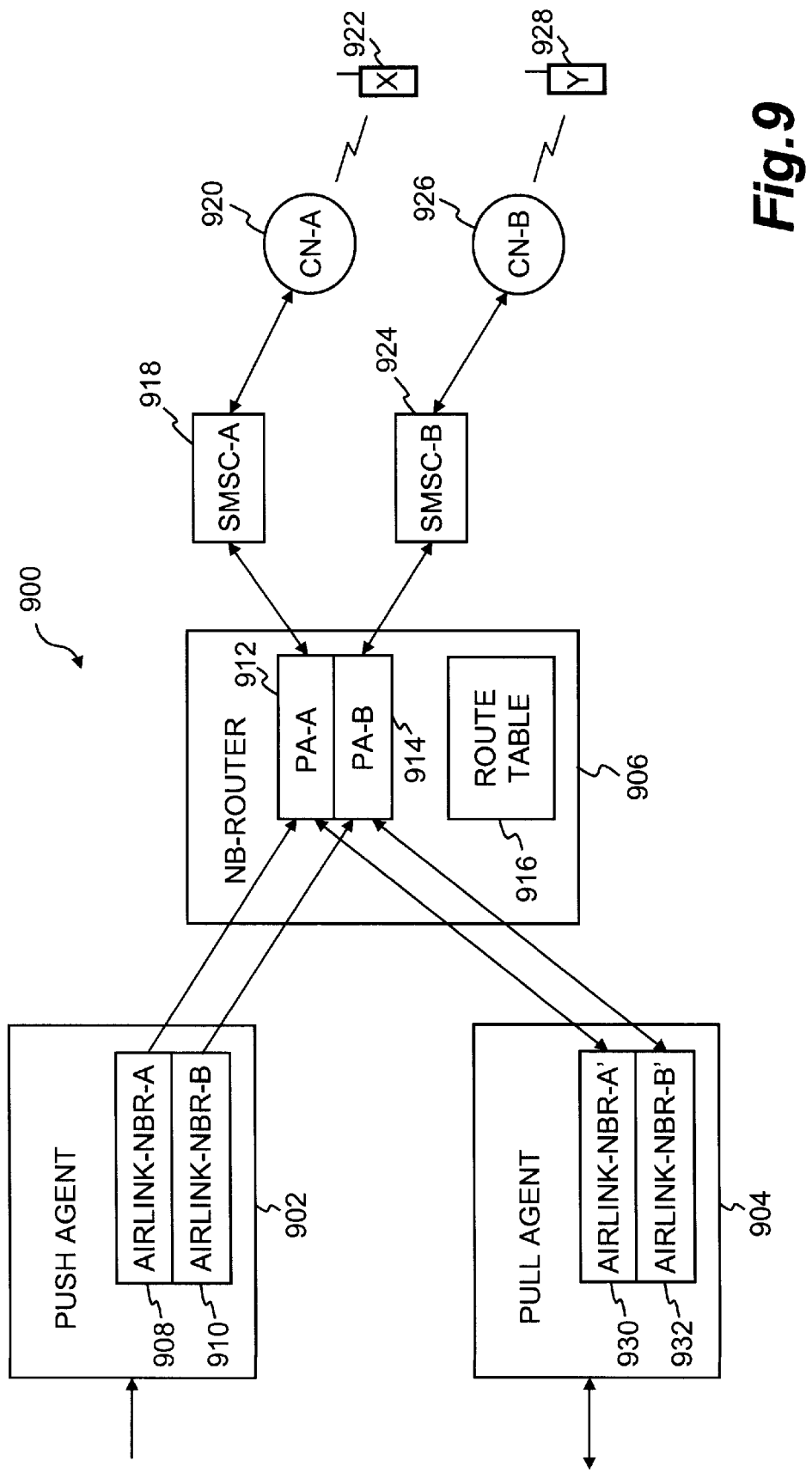
FIG. 9 illustrates a communication system that provides two-way communications over a narrowband channel according to another embodiment of the invention.

FIG. 9 illustrates a communication system 900 that provides two-way communications over a narrowband channel according to another embodiment of the invention. More particularly, the communication system 900 provides two-way SMS as a narrowband channel without additionally having a separate wideband channel. However, the communication system 900 could also include a wideband channel if desired.

The communication system 900 includes a push agent 902, a pull agent 904 and a NB-router 906. The pull agent 902 includes an airlink-NBR-A 908 and an airlink-NBR-B 910. The airlink-NBR-A 908 directs notification messages to a protocol adapter (PA-A) 912 in the NB-router 906 and the airlink-NBR-B 910 directs notification messages to a protocol adapter (PA-B) 914 in the NB-router 906. The NB-router 906 also includes a route table 916 that associates a port number to each of the airlinks in the push agent 902 and the pull agent 904. The route table 916 can also associate each connection with the same port. Using the route table 916, the NB-router 906 can route information between the appropriate airlinks and the SMSC units. Table 1 below illustrates a representative route table for use with the embodiment of the invention illustrated in FIG. 9, where a connection handle (for a connection) is a programming construct that allows messages to be sent or received.

TABLE 1

| Port Number | Connection Handle | Client (Agent-Airlink) |
|---|---|---|
| 1 | H1 | Push Agent-A |
| 1 | H2 | Push Agent-A |
| 2 | H3 | Push Agent-B |
| 2 | H4 | Push Agent-B |
| 2 | H5 | Push Agent-B |
| 2 | H6 | Push Agent-B |
| 3 | H7 | Pull Agent-A |
| 3 | H8 | Pull Agent-A |
| 4 | H9 | Pull Agent-B |

The NB-router 906 (or the protocol adapter (PA-A) 912 itself) is able to forward notification messages from the protocol adapter (PA-A) 912 to a SMSC-A 918 which in turn forwards the messages to a carrier network A 920. The carrier network-A 920 then forwards the notification messages in a wireless manner to wireless communication devices including the wireless communication device 922. The NB-router 906 (or the protocol adapter (PA-B) 914 itself) is likewise able to forward notification messages from the protocol adapter (PA-B) 914 to a SMSC-A 924 which in turn forwards the messages to a carrier network B 926. The carrier network B 926 then forwards the notification messages in a wireless manner to wireless communication devices including a wireless communication device 928.

To provide two-way SMS, the NB-router 906 needs to provide for receiving requests from the wireless communication devices 922 and 928 back to the multi-network gateway or, more specifically, the pull agent 904. With two-way SMS, requests from the wireless communication device 922 can be forwarded in a wireless manner to the carrier network A 920. The carrier network A 920 then forwards the request to the SMSC-A 918. The request is then forwarded by the SMSC-A 918 to the protocol adapter (PA-A) 912. Then, using the port table 916, the appropriate port associated with an airlink-NBR-A' 930 within the pull agent 904 is identified. The protocol adapter (PA-A) 912 then forwards the request from the wireless communication device 922 to the port of the pull agent 904 where the airlink-NBR-A' 930 is waiting to receive such request. In a similar manner, when the wireless communication device 928 sends a request for information from the Internet 216, the request is sent in a wireless manner to the carrier network B 926. The carrier network B 926 then forwards the request onto the SMSC-B 924. The SMSC-B 924 then forwards the request to the protocol adapter (PA-B) 914 within the NB-router 906. Then, using the port table 916, the NB-router 906 determines the port of the pull agent 904 where an airlink-NBR-B' 932 resides so that the message can be forwarded to that airlink which is waiting to receive such request.

Figure 10:
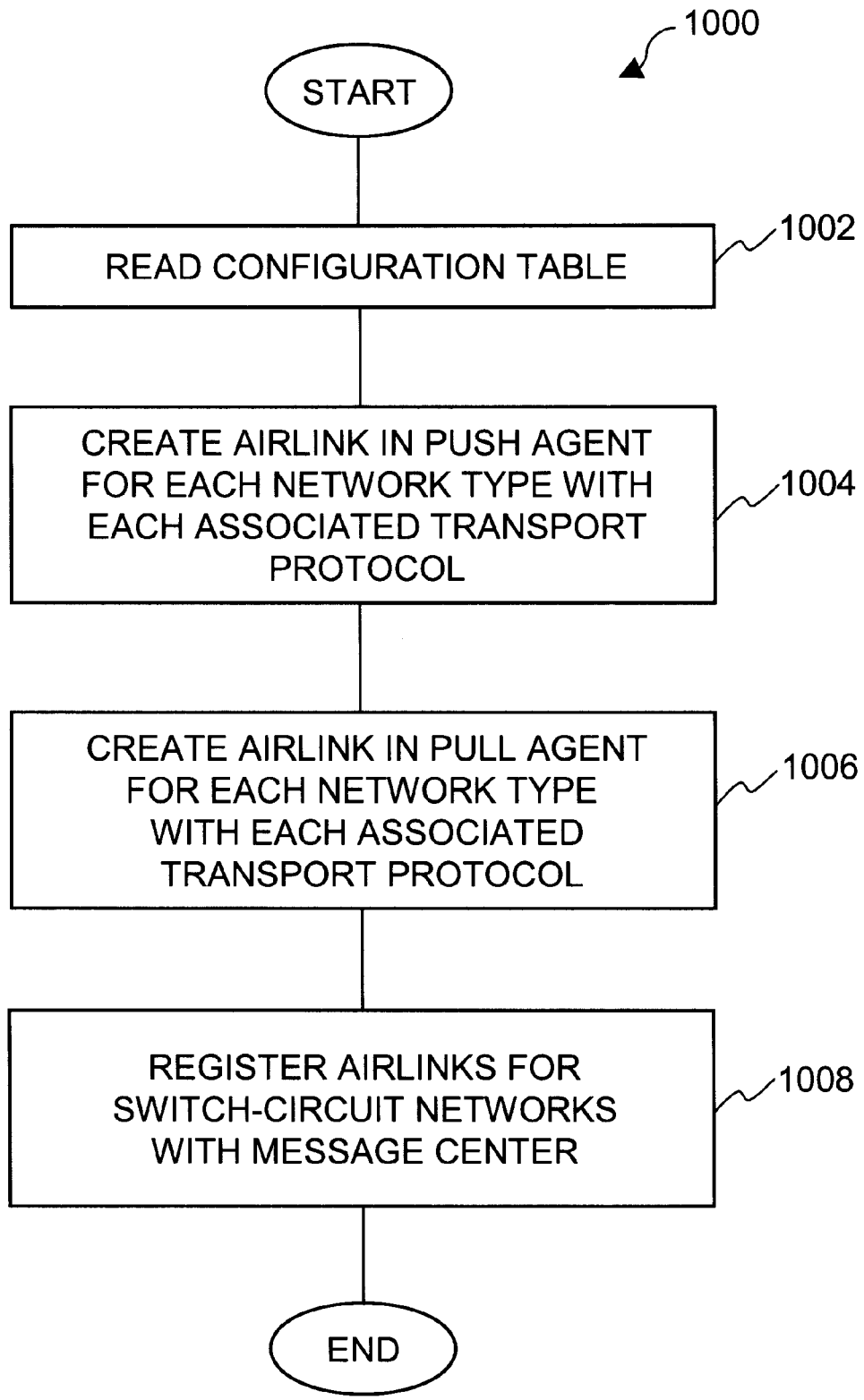
FIG. 10 is a flow diagram of airlink formation processing according to an embodiment of the invention.

FIG. 10 is a flow diagram of airlink formation processing 1000 according to an embodiment of the invention. The airlink formation processing 1000 initially reads 1002 configuration information from a configuration table. For example, the configuration table is the airlink configuration table 322 illustrated in FIG. 3 and has contents such as represented by the airlink configuration table 400 illustrated in FIG. 4. After the configuration information is read, an airlink is created 1004 in the push agent for each network type with each associated transport protocol. For example, with respect to the airlink configuration table 400 illustrated in FIG. 4, at least three (3) airlinks would be created in the push agent. The airlinks are identified that are created have airlink IDs 0001, 0002 and 0004. As an example, these airlinks could be respectively used with the carrier networks A, B and C which were discussed above. The airlink reference by airlink ID 0003 is not created because the airlink enable field disables the airlink from the airlink formation processing 1000. Next, airlinks are created 1006 in the pull agent for each network type with each associated transport protocol. Hence, in a similar fashion, airlinks are created for the pull agent. With respect to the airlink configuration table 400 illustrated in FIG. 4, the pull agent would likewise form three (3) airlinks, identified by the airlink-IDs 0001, 0002 and 0004. Although the airlinks in the push agent and the pull agent generally have the same format and construction, it should be noted that the airlinks established in the push agent may differ slightly from those established in the pull agent. One reason for the difference in the construction of the airlinks is that a retry mechanism for retrying the sending of information that has not been acknowledged as having been received could differ. Also, in certain cases, same or similar carrier networks are able to use a common airlink. In any case, after having created all the necessary airlinks, those of the airlinks that are associated with circuit-switched networks are registered 1008 with the corresponding message centers (e.g., SMSC units). By registering the airlinks, the circuit-switched networks are able to understand that messages or requests from the wireless communication devices being sent out should be directed to the appropriate multi-network gateway. Following block 1008, the airlink formation processing 1000 is complete and ends.

Figure 11:
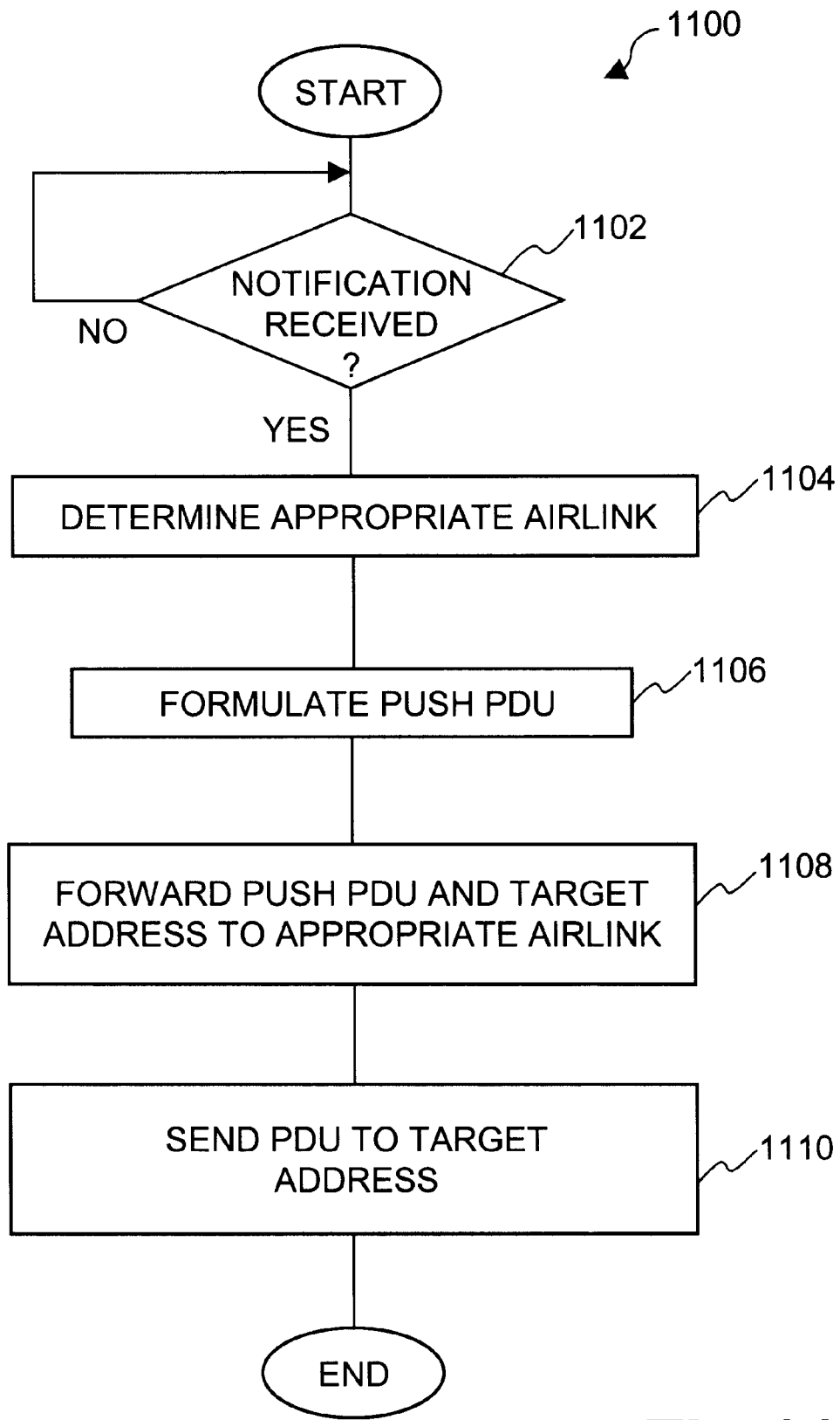
FIG. 11 is a flow diagram of push agent processing according to an embodiment of the invention.

FIG. 11 is a flow diagram of push agent processing 1100 according to an embodiment of the invention. The push agent processing 1100 is processing performed by the push agent of the multi-network gateway.

The push agent processing 1100 initially begins with a decision block 1102. The decision block 1102 determines whether a notification has been received from an application on the Internet. As long as no notification has been received, the push agent processing 1100 simply waits for the receipt of such a notification. Once the decision block 1102 determines that a notification has been received, then the push agent processing 1100 continues. When the push agent processing 1100 continues, for a given notification that has been received, an appropriate airlink is determined 1104. Since the notification that has been received is to be directed to a particular wireless communication device associated with a particular carrier network, the push agent processing 1100 needs to determine 1104 which of the plurality of airlinks associated with the push agent is responsible for communicating with the particular carrier network. For example, the notification will include a target address (e.g., subscriber identifier) that identifies the subscriber of the wireless communication device, knowing the subscriber, the multi-network gateway can determine the device identifier for the wireless communication device and the airlink identifier.

After determining the appropriate airlink for the notification being processed, a push protocol data unit (push PDU) is formulated 1106. The push agent is responsible for forming a push PDU that is to be sent by the multi-network gateway to the wireless communication device. As noted above, a PDU is a common term associated with sending a block of data to a communication device. Next, the push PDU and the target address are forwarded 1108 to the appropriate airlink. Upon receiving the push PDU and the target address, the airlink sends 1110 the push PDU to the target address via the particular carrier network. Following block 1110 the push agent processing 1100 is complete and ends.

Figure 12A:
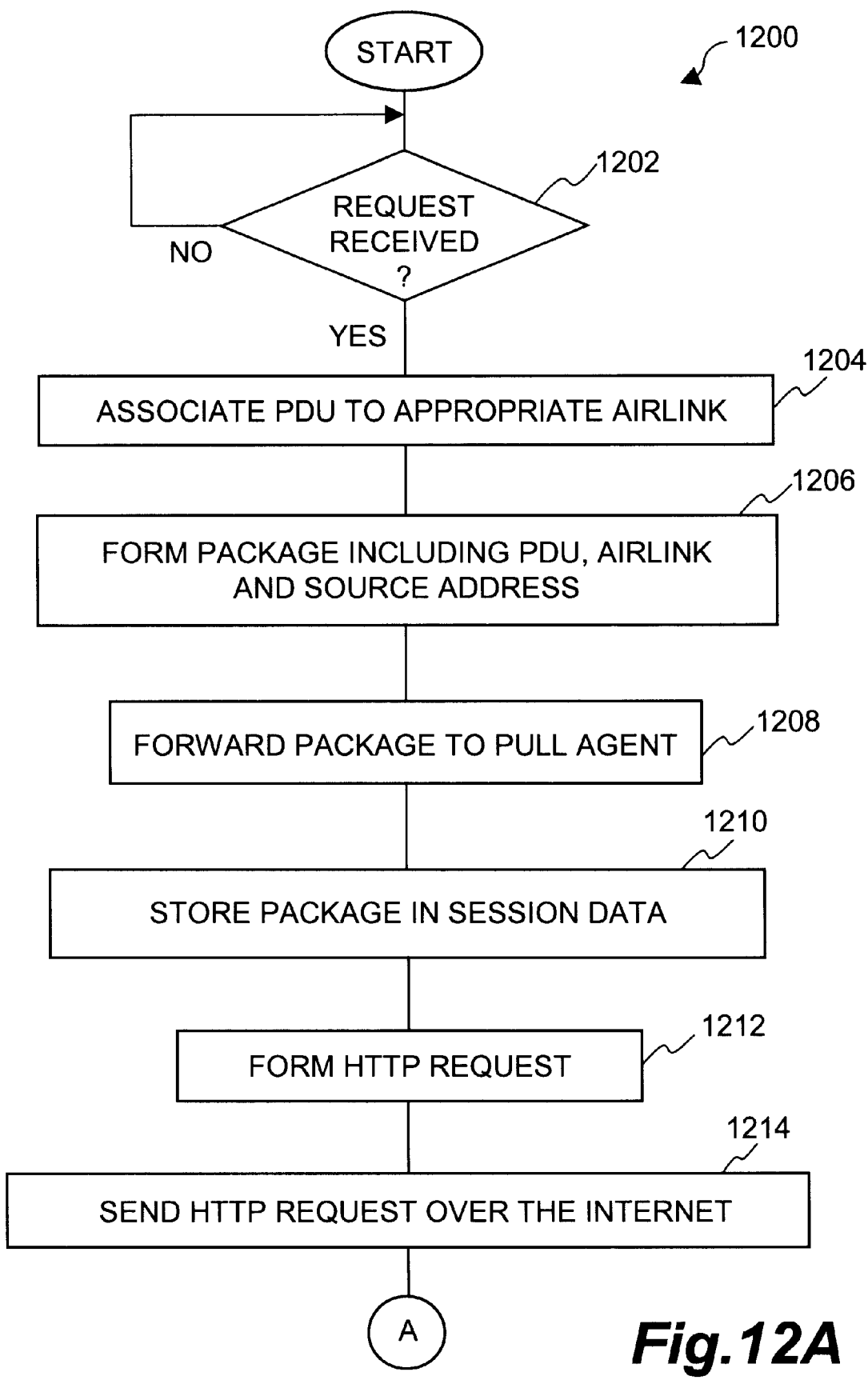
FIGS. 12A and 12B are flow diagrams of pull agent processing according to an embodiment of the invention.
Figure 12B:
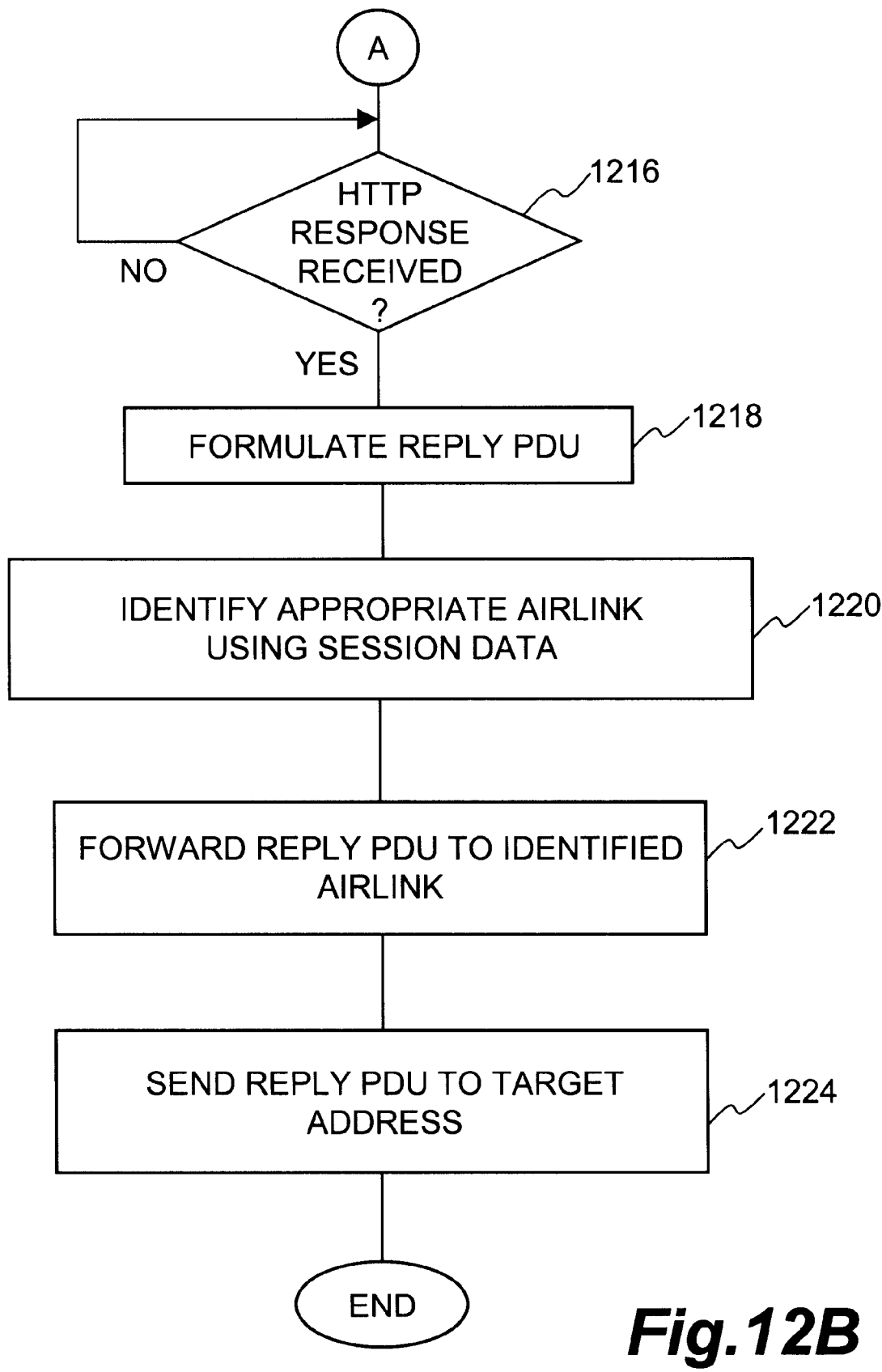

FIGS. 12A and 12B are flow diagrams of pull agent processing 1200 according to an embodiment of the invention. The pull agent processing 1200 is performed by the pull agent within the multi-network gateway.

The pull agent processing 1200 initially begins with a decision block 1202 that determines whether a request has been received. If a request has not yet been received, the pull agent processing 1200 waits for the receipt of such request. Once a request has been received, the pull agent processing 1200 continues. The request that is received is normally a PDU from a wireless communication device.

Once the pull agent processing 1200 continues, the received PDU is associated 1204 with an appropriate airlink within the pull agent. The appropriate airlink is the airlink within the pull agent that is to receive the request (i.e., PDU) that has been received from the wireless carrier network associated with the wireless communication device. Next, the appropriate airlink will operate to form 1206 a package that includes the PDU, the appropriate airlink, and the source address. Then, the package is forwarded 1208 to the pull agent.

After receiving the package, the pull agent then stores 1210 the package in its session data. The session data is maintained by the pull agent to record state information associated with requests being processed by the pull agent. Next, the pull agent forms 1212 a HTTP request. The HTTP request is formed such that the information being requested by the wireless communication device is in fact requested from an application server on the Internet. The pull agent then sends 1214 the HTTP request over the Internet.

After sending the HTTP request, the pull agent waits for a HTTP response from the Internet. Here, a decision block 1216 implements the waiting by determining whether a HTTP response has been received. As long as no HTTP response to the HTTP request has been received, the decision block 1216 causes the pull agent processing 1200 to await such a response. Once the HTTP response has been received, the pull agent processing 1200 operates to formulate 1218 a reply PDU. Here, the pull agent forms the reply PDU from the HTTP response. Then, the appropriate airlink is identified 1220 using the session data. The appropriate airlink for the reply PDU is obtained from the session data which associates the airlink with the original source address which now corresponds to the target address for the reply PDU. After the appropriate airlink is identified, the reply PDU is forwarded 1222 to the identified airlink within the pull agent. The identified airlink within the pull agent then sends 1224 the reply PDU to the target address. Here, by the airlink sending the reply PDU to the target address, the reply PDU is forwarded to the appropriate carrier network then on to the wireless communication device that originally requested the information it now receives in the reply PDU. Following block 1224 the pull agent processing 1200 is complete and ends.

It should be noted that the push agent processing 1100 and the pull agent processing 1200 are preferably implemented in an multi-threaded manner. As such, multiple operations can be performed concurrently for improved efficiency. Also, those skilled in the art should recognize that the decision blocks 1102, 1202 and 1216 would be implemented by separate threads that wait to receive the associated items such that the processing resources of the multi-network gateway are not inefficiently used in constantly polling for the items.

The advantages of the first aspect of the invention are numerous. One advantage of the invention is that different carrier networks are able to interact with a network (e.g., the Internet) in an efficient and cost effective manner. Another advantage of the invention is that information providers are able to build services such that subscribers can obtain information in a relatively simple manner without having to deal with the myriad of different wireless network characteristics. Still another advantage of the invention is that application servers on the Internet are able to provide information to subscribers of wireless networks without having to seriously concern themselves with having to deal with the myriad of different wireless network characteristics. Yet another advantage of the invention is that by centralizing the network access, physical resources are better utilized and software development cost are reduced.

Another aspect of the invention relates to techniques for routing messages to addressable portions (e.g., processes) within an apparatus. The techniques can be performed by a variety of apparatus including, for example, a gateway, a proxy server or a mobile device (e.g., wireless communication device). After receiving the messages routed thereto, the addressable portions are able to process the messages and perhaps return a reply message. Often, the apparatus is a gateway or proxy server coupled between a network containing remote computers storing information and a wireless communication system including a plurality of mobile devices. The processing of the message will typically act to produce a message that forwards certain of the information from one or more of the remote computers on the network to a mobile device coupled to the wireless communication system.

Embodiments of this aspect the invention are discussed below with reference to FIGS. 13–21. However, those skilled in the art will readily appreciate that the detailed description given herein with respect to these figures is for explanatory purposes as the invention extends beyond these limited embodiments.

FIG. 13 is a block diagram of a communication system 1300 according to an embodiment of the invention. The communication system 1300 primarily concerns the use of a narrowband communication channel to provide communications between mobile devices and a network gateway. The network gateway in turn couples the mobile devices to a network. As an example, the communication system 1300 can be used to couple mobile devices to the Internet or application servers on the Internet as illustrated in FIG. 2.

The communication system 1300 includes a network gateway 1302 and a mobile device 1304. Typically, the network gateway 1302 is able to handle communications with respect to a large number of mobile devices. However, for ease of illustration, only a single mobile device 1304 is illustrated in FIG. 13.

The mobile device 1304 communicates with the network gateway 1302 through a small message server center (SMSC) 1306 and a carrier network 1308. As an example, the connection between the SMSC 1306 and the network gateway 1302 is provided by a small message service (SMS) network which is a wired network, and the coupling between the mobile device 1304 and the carrier network 1308 is provided in a wireless manner. In one embodiment, the internal message router 1310 implements a higher layer protocol such as Wireless Datagram Protocol (WDP) over the protocol SMS. In general, it can be said that the mobile device 1304 couples to the network gateway 1302 over a wireless network.

The network gateway 1302 includes an internal message router 1310. The internal message router 1310 operates to route messages incoming to the network gateway 1302 to various gateway processes 1312. In one embodiment, the gateway processes that are to receive the incoming messages include a dispatcher process 1314, an agent-1 process 1316, an agent-2 process 1318, and a messenger process 1320. In general, the agent-1 process 1316 and the agent-2 process 1318 are pull agents that operate to "pull" information from the network to which the gateway network 1302 is coupled. The messenger process 1320 operates as a push agent that operates to "push" information to the mobile devices. The dispatcher process 1314 is a process that is responsible for performing load balancing functions in conjunction with dispatching messages to any of the available agent processes. The agent-1 process 1316, the agent-2 process 1318, and the messenger process 1320 can each access the network to which the network gateway 1302 is coupled, so as to request and/or receive information from the network.

The network gateway 1302 can support the access of a large number of mobile devices and their access to the network. However, depending on the load, the network gateway 1302 may require initiation of new gateway processes 1312 to properly handle the load. Also, when there are multiple gateway processes of the same type (e.g., the agent-1 process 1316 and the agent-2 process 1318), then the dispatcher process 1314 performs load-balancing between the gateway processes 1312 of the same type. The network gateway 1302 also includes a route table 1322. The route table 1322 is used by the internal message router 1310 to properly route incoming messages to the appropriate ones of the gateway processes 1312 within the network gateway 1302. For example, a request for information from the network by the mobile device 1304 would arrive at the internal message router 1310 via the carrier network 1308 and the SMSC 1306. The internal message router 1310 would then determine which of the available agent processes (i.e., the agent-1 process 1316 and the agent-2 process 1318) should receive and process the message. Once the appropriate agent process receives the message, the agent process operates to interact with the network to retrieve the information being requested by the message. The gateway processes 1312 can communicate with the network through a link (or connection) 1324. Once, the requested information is obtained, then the agent process sends a return message including the requested information back to the mobile device 1304. This return message is directed back to the mobile device 1304 via the internal message router 1310, the SMSC 1306 and the carrier network 1308.

In another example, a message destined for the mobile device 1304 is initiated by the network which wants to "push" data to the mobile device 1304. Here, the network "pushes" data to the messenger process 1320 of the gateway processes 1312 in the network gateway 1302. The messenger process 1320 then sends a message including the data to the mobile device 1304. This message is directed to the mobile device 1034 via the internal message router 1310, the SMSC 1306 and the carrier network 1308. The data within the message can be either (i) a notification message to notify the user of the mobile device 1304 of "new data" on the network that would be of interest to the user, or (ii) some or all of the "new data" itself.

Additional details on the operation of the communication system 1300 are described in detail below with respect to FIGS. 14–19. However, it should be noted that the internal message router 1302 is akin to the NB-router discussed above with respect to FIGS. 8A and 9, and thus the internal message router 1302 can also interact with network drivers (e.g., airlinks, protocol adapters, etc.) within an agent process. In effect, the airlinks or protocol adapters are themselves addressable entities, processes or sub-processes.

Figure 14:
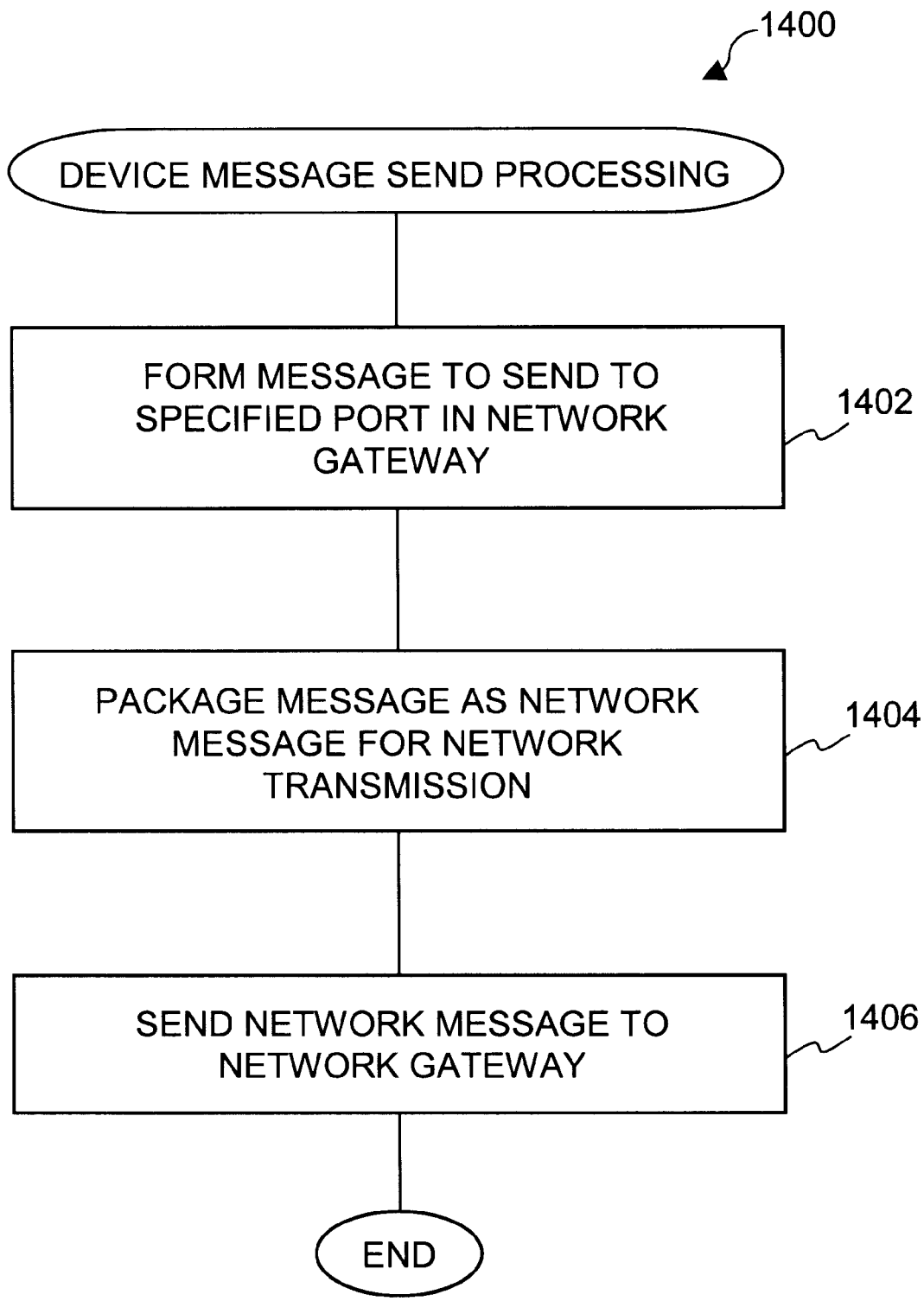
FIG. 14 is a flow diagram of device message send processing according to an embodiment of the invention.

FIG. 14 is a flow diagram of device message send processing 1400 according to an embodiment of the invention. The device message send processing 1400 is performed by a mobile device to send a message to a network gateway. As an example, the mobile device can be the mobile device 1304 and the network gateway can be the network gateway 1302, as illustrated in FIG. 13.

The device message send processing 1400 initially forms 1402 a short message to be sent to a specified port in the network gateway. The message is then packaged 1404 into a network message. Then, the network message is sent 1406 to the network gateway. After the network message has been sent 1406, the device message send processing 1400 is complete and ends. In this embodiment, the network message sent 1406 is a short message because the messages are transmitted between the mobile device and the network gateway over a narrowband channel. The network message contains not only data pertaining to the message, a source port identifier and a destination port identifier, but also a network address for the network gateway.

In one embodiment, the specified port in the gateway is used as the destination port identifier. Initially, following power-up of the mobile device, the first message sent is directed to a predetermined port in the gateway. As an example, the predetermined port number "1905" can be used. As discussed below with respect to claim 21, this enables the communication paths to the gateway processes to bootstrap themselves. The predetermined port number can be provided to the mobile device when it is provisioned or configured by the network gateway. For subsequent messages being sent, the specified port is the destination port identifier of another gateway process, such as one of the agent processes, as provided by subsequent messages incoming to the mobile device from the network gateway.

Figure 15:
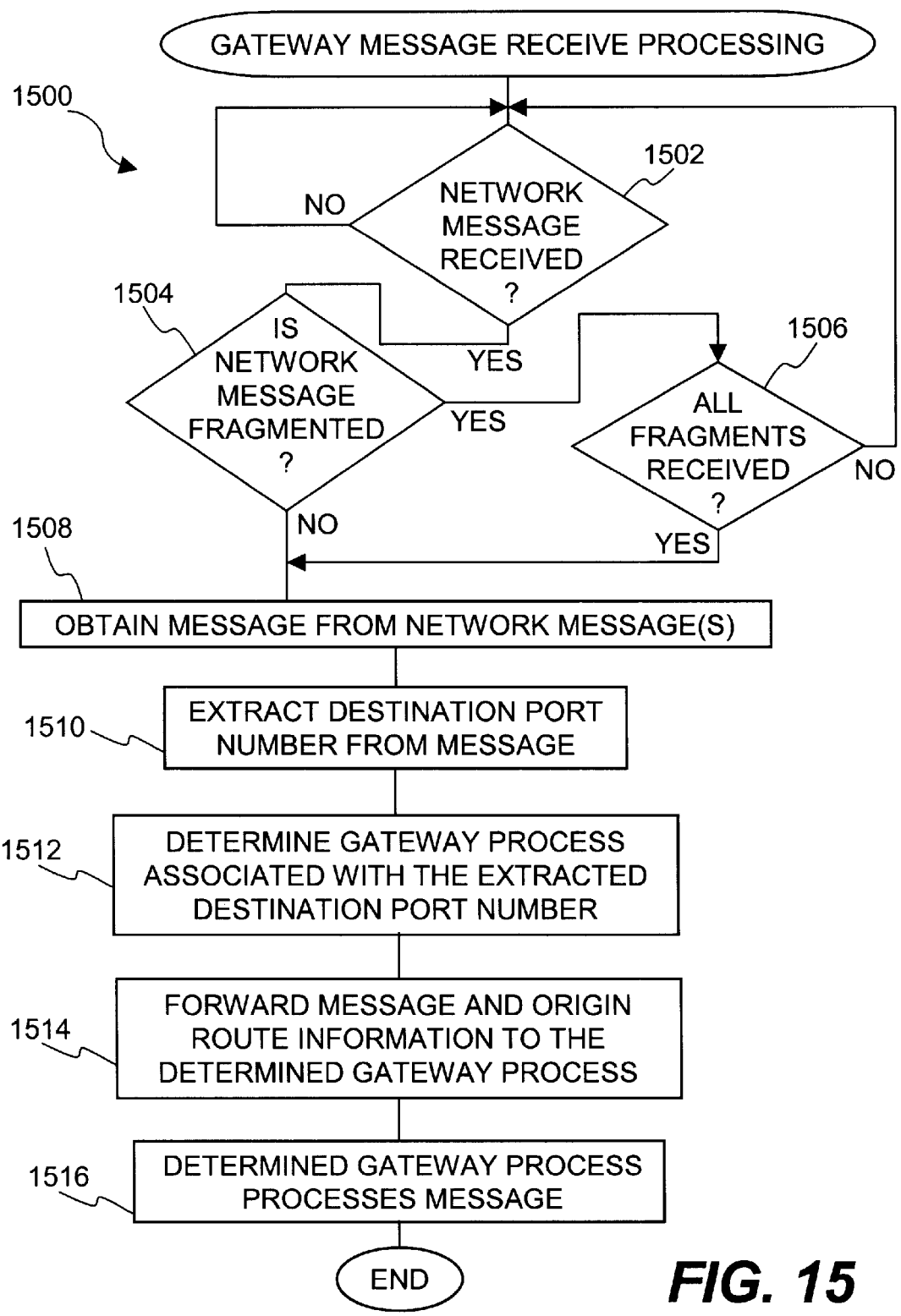
FIG. 15 is a flow diagram of gateway message receive processing according to an embodiment of the invention.

FIG. 15 is a flow diagram of gateway message receive processing 1500 according to an embodiment of the invention. The gateway message receive processing 1500 is performed by a network gateway, such as the network gateway 1302 illustrated in FIG. 15.

The gateway message receive processing 1500 begins with a decision block 1502. The decision block 1502 determines whether a network message has been received. Here, the network message, if received, would have been sent by a mobile device such as the mobile device 1304 illustrated in FIG. 13. If the decision block 1502 determines that a network message has not yet been received, then the gateway message receive processing 1500 awaits the reception of such a message. Once the decision block 1502 determines that a network message has been received, then the gateway message receive processing 1500 continues.

When the gateway message receive processing 1500 continues, a decision block 1504 determines whether the network message is fragmented. When the decision block 1504 determines that the network message that has been received is fragmented, then a decision block 1506 determines whether all of the fragments for the message have been received. If all of the fragments have not yet been received, then the decision block 1506 causes the gateway message receive processing 1500 to await the reception of all of the fragments.

Following the reception of all of the fragments, or following the decision block 1504 when the network message is not fragmented, the gateway message receive processing 1500 begins to process the network message. Here, a message is obtained from the network message or from several network messages in the case of fragmentation. In one embodiment, the message is referred to as a short message (SM) because the type of messages transmitted by the SMSC 1306 to the network gateway 1302 are short messages due to bandwidth constraints. Next, the destination port number is extracted 1510 from the message. The format of the message is such that one of its fields identifies the destination port number for the message, and another of the fields of the message identifies a source port number for the message. With such a format, the destination port number identifies a particular port within the network gateway that is to receive and then process the message, and the source port identifier identifies a particular port within the mobile device that sent the message.

The gateway message receive processing 1500 then operates to determine 1512 the gateway process that is associated with the extracted destination port number. Here, the gateway process that is associated with the particular port identified by the extracted destination port number is determined 1512. In one embodiment, the route table 1322 illustrated in FIG. 13 can be used to determine 1512 the gateway process that is associated with the extracted destination port number. In such a case, the route table 1322 includes entries that associate destination port numbers with certain of the gateway processes 1312. Hence, the appropriate gateway process can be determined through use of the route table 1322.

Next, the message is forwarded 1514 together with origin route information to the determined gateway process. The origin route information is information on how a return message should be routed or addressed so that it can be returned to the mobile device that sent the original message. As an example, in the embodiment illustrated in FIG. 13, the internal message router 1310 would operate to forward the message with the origin route information to one of the gateway processes 1312.

After the message has been forwarded 1514, the determined gateway process is able to process 1516 the message. In processing the message, the gateway process will normally interact with the network to obtain information. Following block 1516, the gateway message receive processing 1500 is complete and ends.

The network message being sent (FIG. 14) and received (FIG. 15) can be fragmented if necessary. Additional details on fragmentation of messages are described in U.S. application Ser. No. 09/105,691, filed Jun. 26, 1998, and entitled "METHOD AND APPARATUS FOR FRAGMENTING MESSAGES FOR A WIRELESS NETWORK USING GROUP SHARING OF REFERENCE NUMBERS", which is hereby incorporated by reference.

Figure 16:
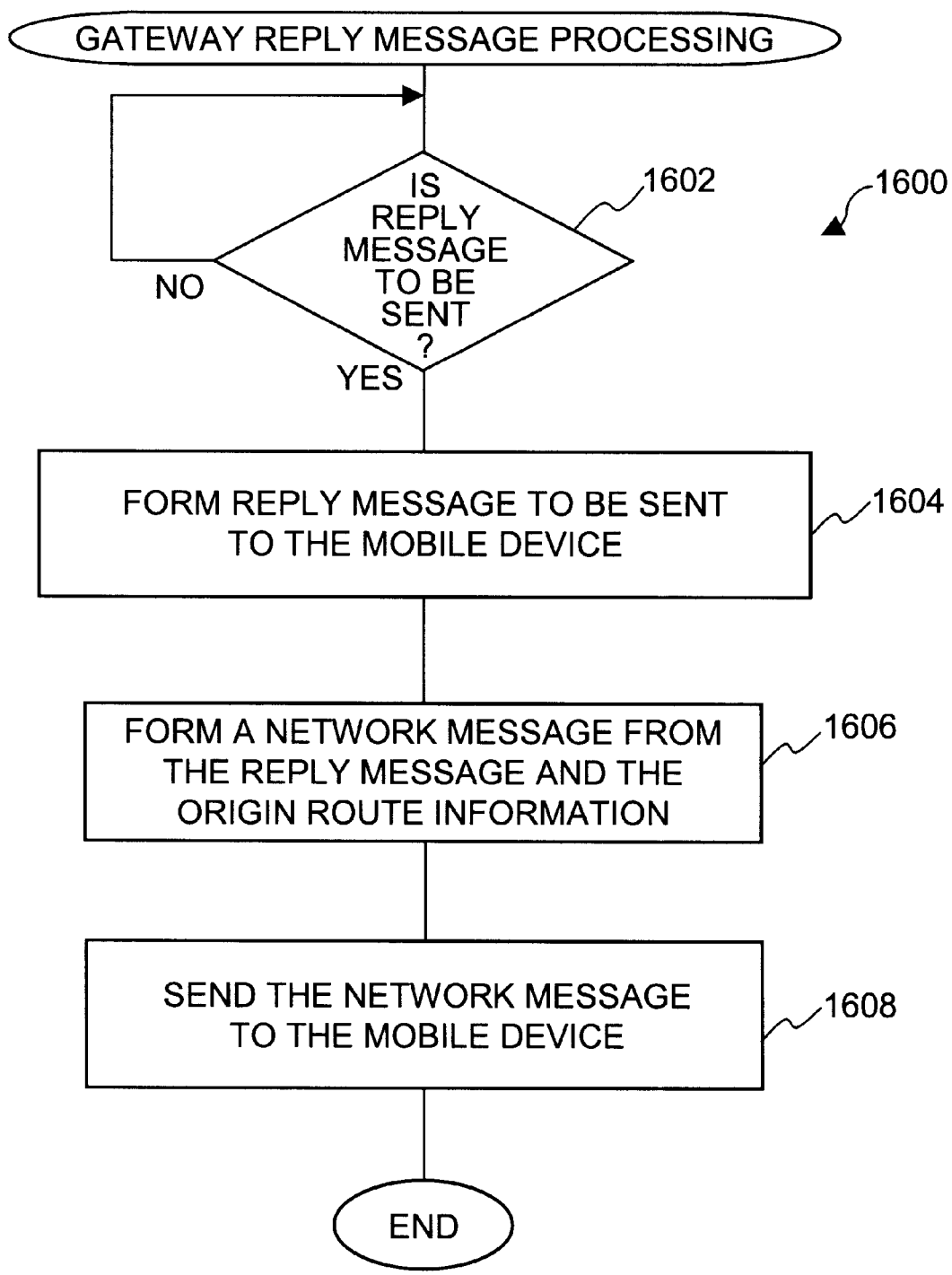
FIG. 16 illustrates a flow diagram of gateway reply message processing according to an embodiment of the invention.

After a message from the mobile device is sent to the gateway, the gateway then operates to internally route the message to a particular gateway process that is to actually process the message. Normally, the particular gateway process will then produce a reply message that is to be returned to the mobile device that initiated the communication. FIG. 16 illustrates a flow diagram of gateway reply message processing 1600 according to an embodiment of the invention. The gateway reply message processing 1600 is, for example, performed by a gateway, such as the gateway 1302 illustrated in FIG. 13, when a reply message is to be returned to a mobile device.

The gateway reply message processing 1600 begins with a decision block 1602. The decision block 1602 determines whether a reply message should be sent. If a reply message is not to be sent, then the gateway reply message processing 1600 is either not invoked or simply awaits the condition in which a reply message is to be sent. In other words, the gateway reply message processing 1600 effectively does nothing until the decision block 1602 determines that a reply message is to be sent from the gateway to the mobile device.

Once the decision block 1602 determines that a reply message is to be sent, then the gateway reply message processing 1600 continues. A reply message to be sent to the mobile device is then formed 1604. In one embodiment, the reply message is formed by the particular process to which the message was originally routed. The reply message to be sent to the mobile device includes the destination port number that is associated with a port within the mobile device. The port within the mobile device that is identified by the destination port number is the location or process within the mobile device that is to receive the reply message.

Next, the gateway forms 1606 a network message from the reply message and the origin route information. In one embodiment, in effect, the reply message is packaged into a network message so that it is formatted for transmission from the gateway to the mobile device. Thereafter, the gateway sends 1608 the network message to the mobile device. Following block 1608, the gateway reply message processing 1600 is complete and ends.

In one embodiment, the gateway reply message processing 1600 is performed by the network gateway 1302 of the communication system 1300 illustrated in FIG. 13. The process that processes the incoming message also normally operates to form 1604 the reply message. This process then forwards the reply message and the associated origin route information to the internal message router 1310. The internal message router 1310 then forms 1606 the network message from the reply message and the origin route information. The internal message router 1310 then sends 1608 the network message to the mobile device 1304 via the SMSC 1306 and the carrier network 1308. Hence, in this embodiment, the gateway processes 1312 communicate with the mobile device through the internal message router 1310. Within the reply message, the source port is determined by the internal message router 1310 from a connection handle for the process that processes the incoming message and initiates the reply message, and the destination port is determined using the origin route information.

Figure 17:
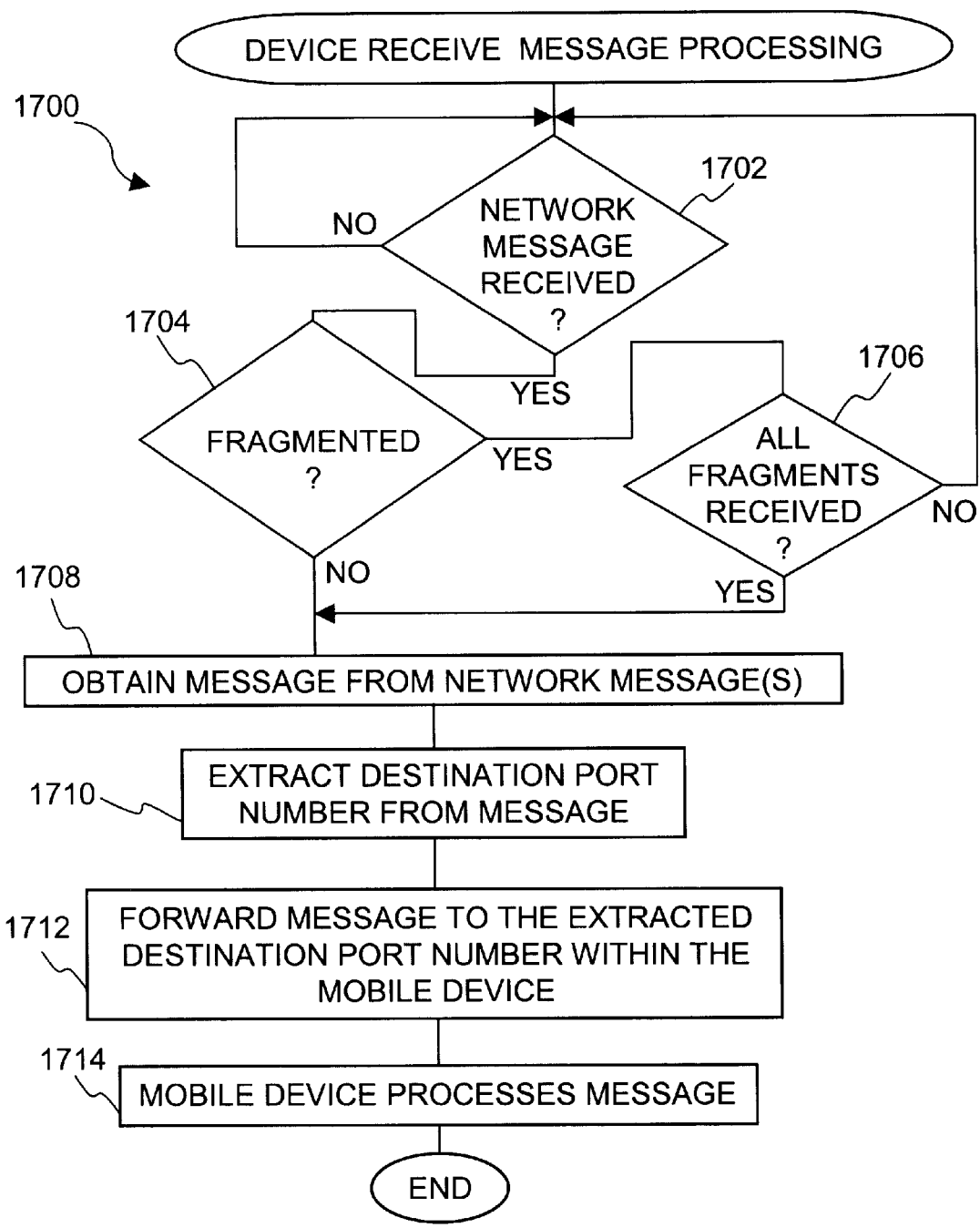
FIG. 17 is a flow diagram of device receive message processing according to an embodiment of the invention.

FIG. 17 is a flow diagram of device receive message processing 1700 according to an embodiment of the invention. The device receive message processing 1700 begins with a decision block 1702. The decision block 1702 determines whether a network message has been received. If a network message has not yet been received, the decision block 1702 causes a device receive message processing 1700 to await the reception of a network message. Alternatively, the device receive message processing 1700 can be viewed as not beginning until a network message has been received. Once the decision block 1702 determines that a network message has been received, then the device receive message processing 1700 continues.

When the device receive message processing 1700 continues, a decision block 1704 determines whether the network message that has been received is fragmented. If the decision block 1704 determines that the network message is fragmented, then a decision block 1706 determines whether all of the fragments of the network message have been received. If all the fragments have not yet been received, the device receive message processing returns to block 1702 to receive the remaining fragments.

Following block 1706 as well directly following the decision block 1704 when the network message is not fragmented, a message is obtained 1708 from the network message or from multiple network messages in the case of fragmentation. In one embodiment, the message format includes at least a destination port number, a source port number, and a data region. Next, a destination port number is extracted 1710 from the message. The destination port number identifies a particular port within the mobile device that is to receive the message. The message is forwarded 1712 to the extracted destination port number within the mobile device. Then, the mobile device processes 1714 the message. Following block 1714, the device received message processing 1700 is complete and ends.

Returning to FIG. 13, the gateway 1302 has a scaleable design so that loads of various sizes can be supported by a common gateway architecture. For example, the gateway 1302 can support anywhere from one to many different agent processes to handle messages with respect to particular mobile devices. If large numbers of mobile devices require the handling of their messages (i.e., heavy loading conditions), the gateway 1302 can add additional processes (e.g., agent processes) so that the messages can be properly and efficiently processes by the available agent processes. Likewise, if there are a lot of demand for pushing of messages from the network through the gateway 1302 to the mobile devices 1304, the gateway 1302 can add additional messenger processes. Regardless of load conditions, the gateway 1302 typically only requires a single dispatcher 1314 to manage the various agents and messenger processes.

Figure 18:
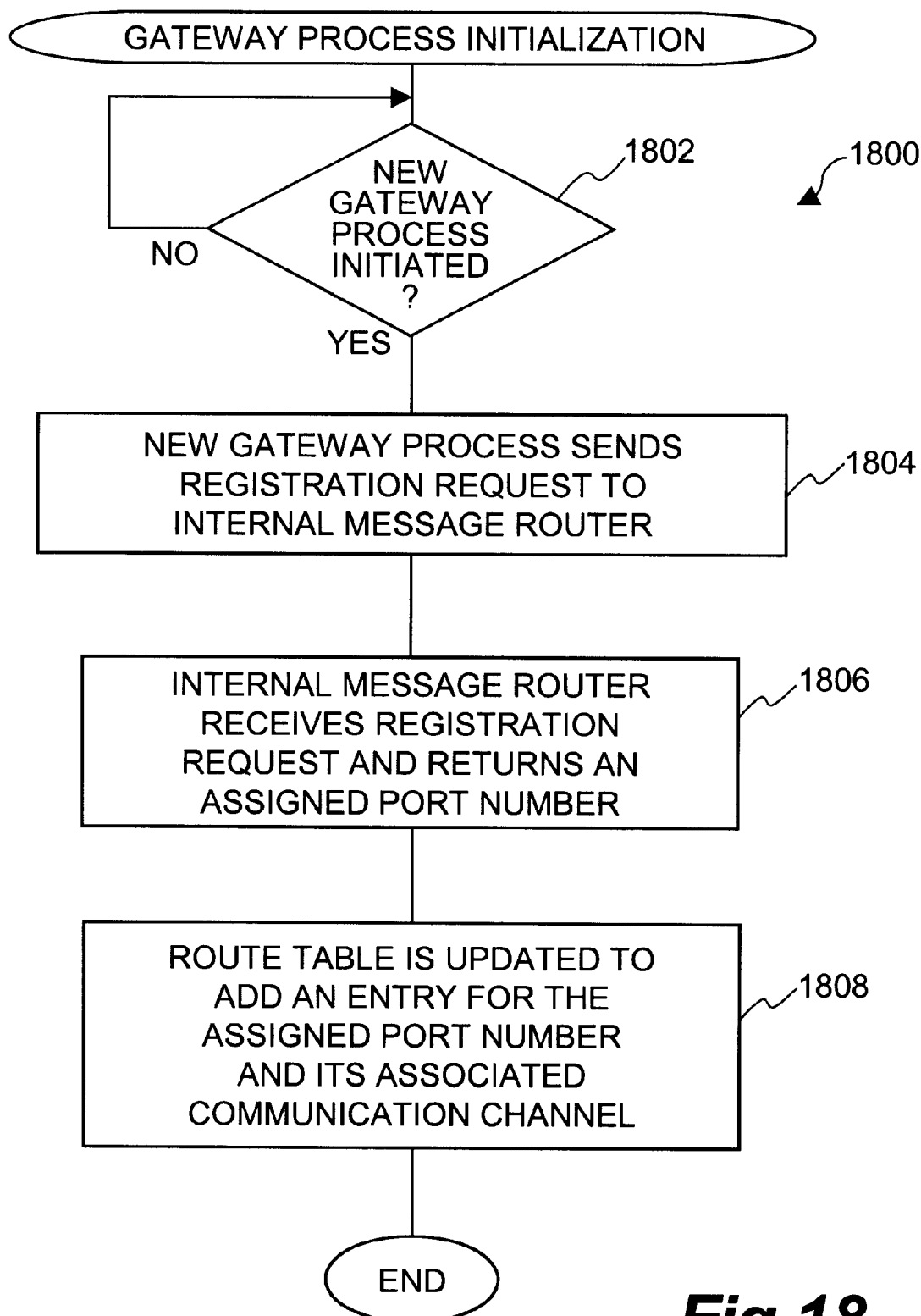
FIG. 18 illustrates a flow diagram of gateway process initialization according to an embodiment of the invention.

FIG. 18 illustrates a flow diagram of gateway process initialization 1800 according to an embodiment of the invention. The initialization of gateway processes is performed to coordinate their processing capabilities with an internal message router that directs messages to and from these gateway processes. For example, with respect to FIG. 13, the gateway processes 1312 are initialized when activated for use by the gateway 1302. In one embodiment, the gateway processes 1312 register with the internal message router 310 when activated.

The gateway process initialization 1800 begins with the decision block 1802. The decision block 1802 determines whether a new gateway process has been activated. When the decision block 1802 determines that a new gateway process has not been activated, then the gateway process initialization 1800 simply awaits the activation of a new gateway process. Alternatively, the gateway process initialization 1800 can be considered to begin once a gateway process is newly activated.

Once the decision block 1802 has determined that a new gateway process has been activated, then the gateway process initialization 1800 continues to properly initialize the gateway process. Specifically, the new gateway process sends 1804 a registration request to the internal message router. For example, with respect to FIG. 13, if the agent-1 process 1316 was newly activated, the agent-1 process 1316 would send a registration request to the internal message router 1310. Next, after the new gateway process sends 1804 the new registration request, the internal message router receives the registration request and returns 1806 an assigned port number to the new gateway process. Hence, the registration of the new gateway process with the internal message router causes the new gateway process to be assigned a port number that is thereafter used to communicate with the new gateway process. Additionally, a route table is updated 1808 to add an entry for the assigned port number and its associated communication channel so that the internal message router knows which communication channel to utilize to forward messages to the new gateway process. Following block 1808, the gateway process initialization 1800 is complete and ends.

Figure 19:
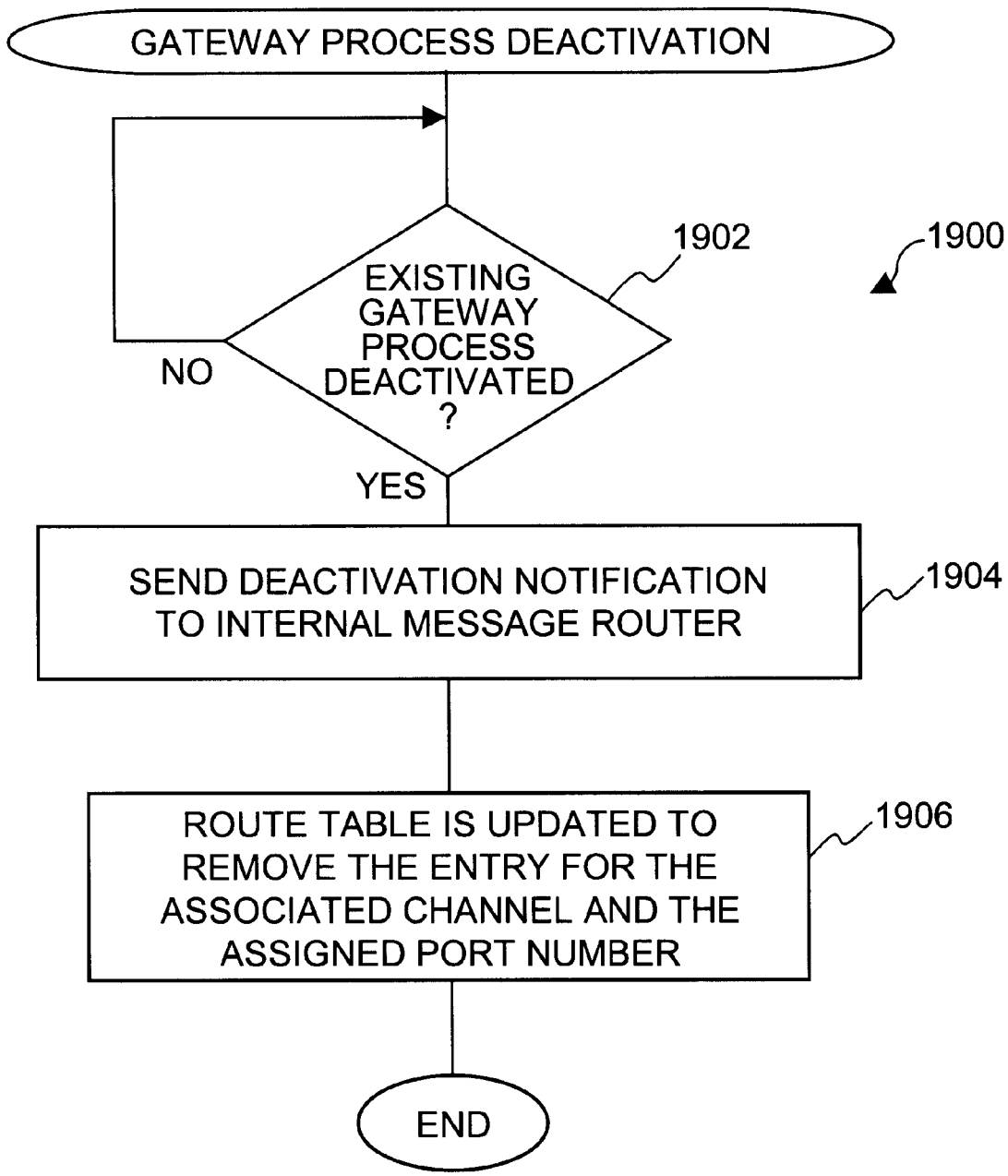
FIG. 19 is a flow diagram of gateway process deactivation according to an embodiment of the invention.

FIG. 19 is a flow diagram of gateway process deactivation 1900 according to an embodiment of the invention. The gateway process deactivation 1900 is performed when a gateway process that was previously activated for use by a gateway becomes deactivated upon its removal from the gateway. The gateway process deactivation 1900 begins with a decision block 1902. The decision block 1902 determines whether an existing gateway process has been deactivated. When the decision block 1902 determines that an existing gateway process has not recently been deactivated, then the gateway process deactivation 1900 simply awaits the detection of the deactivation of an existing gateway process. Alternatively, the gateway process deactivation 1900 can be considered to begin once a gateway process requests deactivation or has just been deactivated.

Once the decision block 1902 determines that an existing gateway process has been deactivated, then the gateway process deactivation 1900 continues so that the deactivation procedure is performed. In particular, a deactivation notification is sent 1904 to the internal message router. Alternatively, instead of a deactivation notification, the existing gateway process could simply expire and the internal message route can subsequently detect its loss. Then, the route table is updated 1906 to remove the entry for the associated channel and the assigned port number. Following block 1906, the gateway process deactivation 1900 is complete and ends.

For example, with respect to FIG. 13, if the agent-1 process 1316 was deactivated, then the agent-1 process 1316 would notify the internal message router 1310 that it is being deactivated. This notification would be the sending 1904 of the deactivation notification. The internal message router 1310 would then, upon receiving the deactivation notification, update 1906 the route table 1322 so as to remove the entry (or multiple entries) associated with the agent-1 process 1316.

Figure 20:
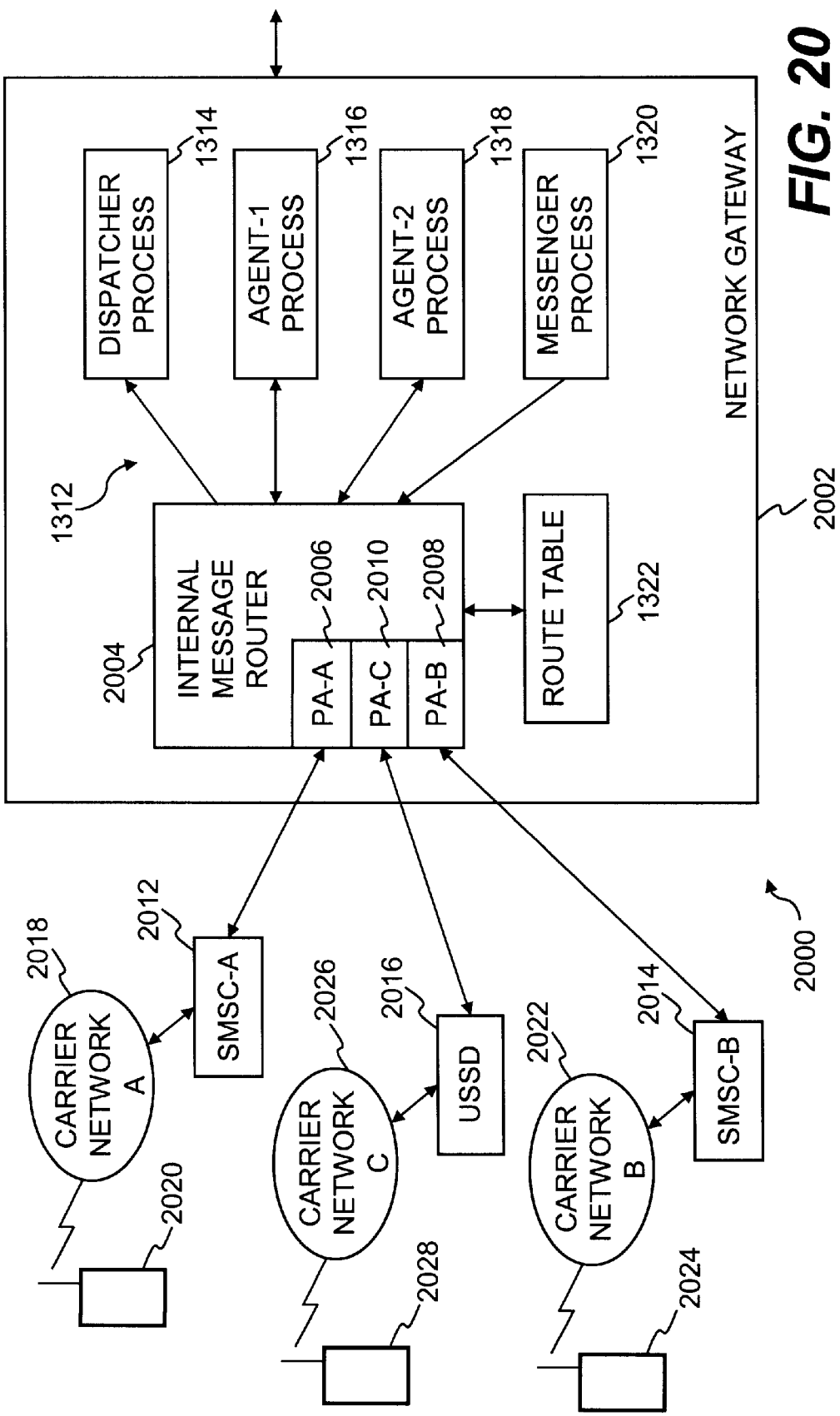
FIG. 20 is a block diagram of a communication system according to another embodiment of the invention.

FIG. 20 is a block diagram of a communication system 2000 according to another embodiment of the invention. The communication system 2000 includes a network gateway 2002 that has a configuration similar to the network gateway 1302 illustrated in FIG. 13. Namely, the network gateway 2002 includes the dispatcher process 1314, the agent-1 process 1316, the agent-2 process 1318, the messenger process 1320, and the route table 1322 as discussed above with respect to FIG. 13. The network gateway 2002 also includes an internal message for router 2004. The internal message router 2004 operates as discussed above (e.g., the internal message router 1310) but further includes various protocol adapters (PAs). In particular, the internal message router 2004 includes a protocol adapter-A (PA-A) 2006, a protocol adapter-B (PA-B) 2008, and a protocol adapter-C (PA-C) 2010. These protocol adapters are used by the internal message router 2004 when sending or receiving messages to mobile devices so that the appropriate network characteristics and protocols can be used for the respective networks over which these messages will traverse. By centralizing these protocol adapter in the internal message router 2004, the design and maintenance of the gateway processes 1312 become less burdensome which renders the network gateway 2002 efficiently scaleable. Such protocol adapters were discussed above with respect to the NB-router 810 and 906 illustrated in FIGS. 8A and 9, respectively.

The communication system 2000 also includes multiple service centers, including SMSC-A 2012, SMSC-B 2014, and USSD 2016. The service centers 2012, 2014 and 2016 are respectively associated with a carrier network A 2018 and its mobile devices 2020, a carrier network B 2022 and its mobile devices 2024, and a carrier network C 2026 and its mobile devices 2028. In such an embodiment, the different protocol adapters 2006, 2008 and 2010 of the internal message router 2004 can be assigned different network addresses numbers so that the mobile devices associated with the different carrier networks can direct their messages to the appropriate protocol adapter for that type of network. For example, the network gateway 2002 could use three network addresses (e.g., "123", "456, and "789") for the protocol adapters 2006, 2008 and 2010, respectively. The appropriate network address to the network gateway 2002 for a given mobile device would be provided to the mobile device during initial provisioning or configuring following power-up. Additionally, the route information forwarded to the gateway processes 1312 that process the incoming messages can also include an identifier for the appropriate protocol adapter so that the outgoing reply message can be sent from the appropriate protocol adapter.

It should be noted from FIG. 20 that the network gateway 2002 can support a variety of different types of networks. These networks include, for example, wireless networks such as GSM, CDMA, and TDMA which use network protocols such as SMS and USSD. Hence, the architecture of the communication system 2000 allows a single network gateway to concurrently support various different networks. The gateway processes 1312 are then insulated from protocol specifics and can focus on message processing. If desirable, the gateway processes 1312 can utilize network drivers or airlinks for additional specialized processing to communicate with the different types of networks being utilized in the communication system 2000.

Figure 21:
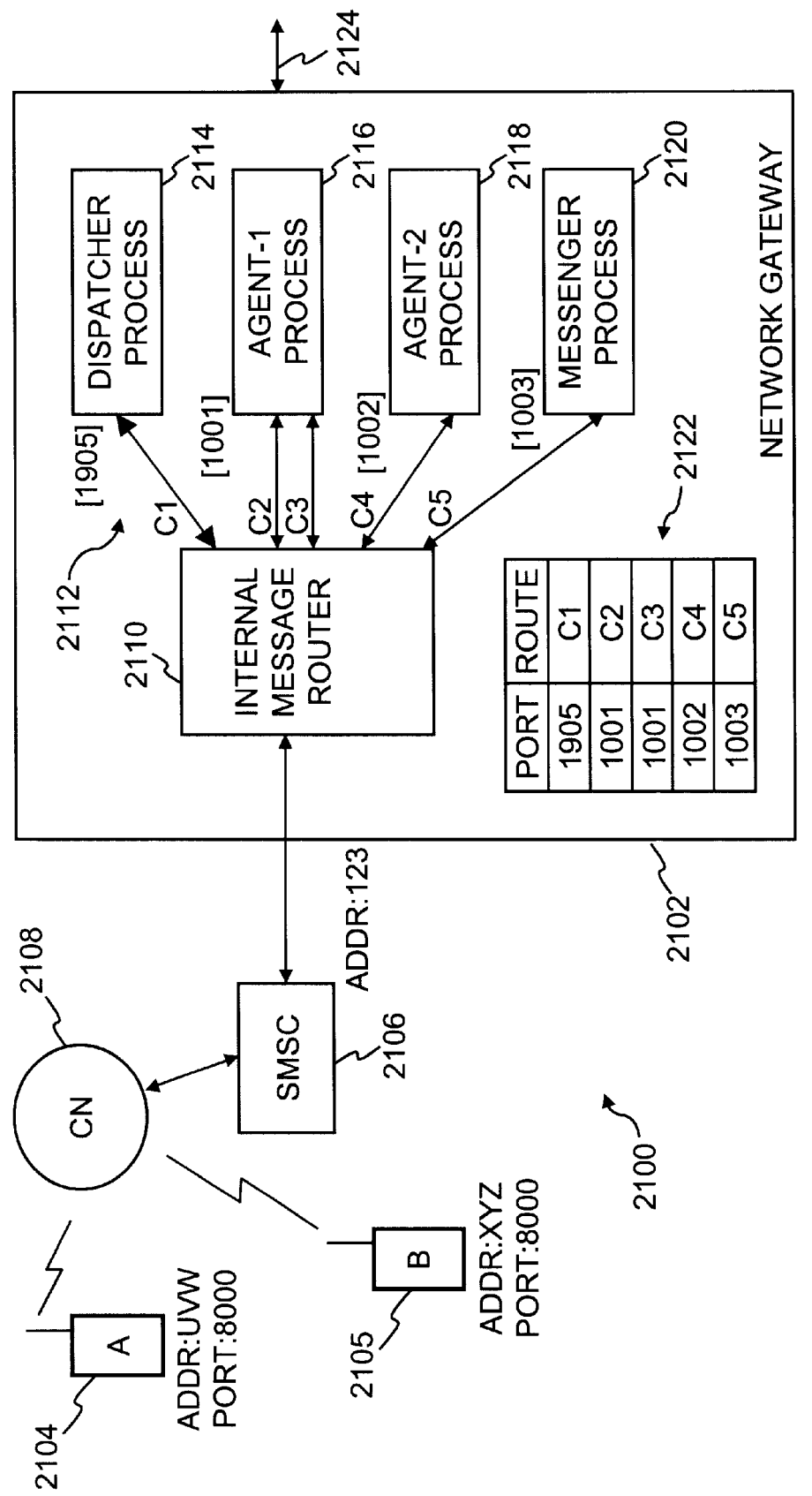
FIG. 21 is an exemplary block diagram of a communication system according to an embodiment of the invention.

FIG. 21 is an exemplary block diagram of a communication system 2100 according to an embodiment of the invention. In this exemplary embodiment, the communication system 2100 is structurally similar to the communication system 1300 illustrated in FIG. 13. More particularly, the communication system 2100 includes a network gateway 2102 located between a network and mobile device A 2104 and mobile device B 2105. The mobile devices 2104 and 2105 communicate with the network gateway 2102 through a small message server center (SMSC) 2106 and a carrier network 2108. The connection between the SMSC 2106 and mobile devices 2104 and 2105 is over a GSM network using a SMS protocol. Such a network is classified as a narrowband network. The SMSC 2106 forwards messages between the carrier network 2108 and the network gateway 2102.

The network gateway 2102 includes an internal message router 2110. The internal message router 2110 operates to route messages incoming to the network gateway 2102 to various gateway processes 2112. In this embodiment, the gateway processes that are to receive the incoming messages include a dispatcher process 2114, an agent-1 process 2116, an agent-2 process 2118, and a messenger process 2120. The agent-1 process 2116 and the agent-2 process 2118 are pull agents that operate to "pull" information from the network to which the gateway network 2102 is coupled. The messenger process 2120 operates as a push agent that operates to "push" information to the mobile devices. The messenger process 2120 may or may not be able to receive incoming messages from the mobile devices depending on the design of the messenger process 2120. The dispatcher process 2114 is a process that is responsible for performing load balancing functions in conjunction with dispatching messages (at least initial messages from mobile devices) to any of the available agent processes 2116 and 2118. The agent-1 process 2116, the agent-2 process 2118, and the messenger process 2120 can each access the network to which the network gateway 2102 is coupled so as to request and/or receive information from the network. As an example, these processes can access the network (e.g., Internet) using an HTTP module as shown in FIG. 3. The network gateway 2102 also includes a route table 2122. The route table 2122 is used by the internal message router 2110 to properly route incoming messages to the appropriate ones of the gateway processes 2112 within the network gateway 1302.

For purposes of the exemplary embodiment in FIG. 21, the network address for the mobile device A 2104 is "UVW", the network address for the mobile device B 2105 is "XYZ", and the network address for the network gateway 2102 is "123". Further, certain process used within the communication system 2100 are assigned the following port numbers. Processes within the mobile devices 2104 and 2105 are assigned port number "8000". As an example, these processes associated with port number "8000" are network browsers that interact with the network via the network gateway 2102. Within the network gateway 2102, the dispatcher process 2114 is assigned port number "1905", the agent-1 process 2116 is assigned port number "1001", the agent-2 process 2118 is assigned port number "1002", and the messenger process 2120 is assigned port number "1003". Still further, the route table 2122 is assumed to associate ports to communication channels (i.e., routes). As illustrated in FIG. 21, the current state of the route table 2122 associates port number "1905" with communication channel C1, associates port number "1001" with communication channels C2 and C3, associates port number "1002" with communication channel C4, and associates port number "1003" with communication channel C5.

An exemplary operation of the communication system 2100 is then the sending of a message from the mobile device A 2104 to the network gateway 2102 requesting information from the network that is coupled to the network gateway 2102. In such a case, the process at port number "8000" forms a message including a source port number, a destination port number, and a data portion. The mobile device A 2104 then packages the message in accordance with a network protocol such as SMS, thus forming a short message (SM). In accordance with the SMS protocol, the messages are limited in size and are thus known as short messages (SM). If needed, the message can be fragmented and sent as a series of short messages (SM). The initial message sent is sent to the dispatcher process 2114 which the mobile device A 2104 knows from provisioning or configuring is at port "1905".

A representative format for the short message to be sent from the process at port number "8000" in the mobile device A 2104 to the dispatcher process 2114 at port number "1905" is as follows.

Send [123, SM(8000, 1905, data)]

When sent, the SMSC 2106 receives the short message and directs it to the network gateway 2102 because the network gateway 2102 has a network address of "123". At the network gateway 2102, the internal message router 2110 handles the incoming short message and performs a routing operation. The internal message router 2110 will also perform some initial processing prior to routing the message, such as reassembly if the short message is a fragment of a larger message.

The routing operation by the internal message router 2110 is performed as follows. The incoming short message is SM(8000, 1905, data) which signals the internal message router 2110 that the short message should be routed to the one of the gateway processes 2112 that is associated with port number "1905". Hence, the internal message router 2110 extracts the destination port number "1905" from the short message, then looks-up the destination port number in the route table 2112. Here, in this exemplary embodiment, the communication channel C1 is identified by the route table 2122 as being associated with the port number "1905". Hence, the communication channel C1 is to be used to send messages to the port number "1905" which is known to correspond to the dispatcher process 2114. Then, the internal message router 2110 forwards the short message to the dispatcher process 2114 over the communication channel C1.

In this example, the short message is a "pull" type request, so either the agent-1 process 2116 or the agent-2 process 2118 are used to process the short message by interacting with the network to retrieve the requested information. The dispatcher process 2114 performs load balancing when multiple available processing agents are available so as to select the most appropriate one of the agent-1 process 2116 or the agent-2 process 2118. Here, assume that the dispatcher 2114 refers the short message to the agent-1 process 2116 for processing of the short message. The agent-1 process 2116 then performs the short message which in this example is a request for information from the network. The gateway processes 2112 can communicate with the network through a link (or connection) 2124.

Normally, the initial short message is a request for information. The returning of the requested information is referred to as a reply message. Here, in the exemplary embodiment, once the agent-1 process 2116 has obtained the requested information from the network, a reply message (RM) can be made. The agent-1 process 2116 informs the internal message router 2110 that a reply message can be returned. As an example, the agent-1 process 2116 can inform the internal message router 2110 over a suitable communication channel, such as the communication channel C2. The reply message would be RM(1001, 8000, data), as the agent-1 process 2116 is now the source port number "1001" and the destination port number is "8000". The source port number "1001" is determined by the internal message router 2110 by use of the route table 2122. The destination port number is obtained from the source port number of the short message being processed. The data of the reply message is the requested information that was obtained from the network.

When the short message is sent from the internal message router 2110 to the agent-1 process 2116, routing information is sent together with message. The routing information, for example, identifies the information that is used to route a message back to a mobile device of a requestor. Here, the routing information could be "UVW" which is the network address of the mobile device A 2104. In a different embodiment, the routing information could identify a network driver (e.g., airlink or protocol adapter) alone or together with the network address. Alternatively, if both network driver and network address are needed, the routing information could include one and use a table to determine the other. Yet another alternative, is for the routing information to be a pointer to a table that includes either or both of the network driver and the network address.

In any case, the internal message router 2110 receives the reply message and the routing information. The internal message router 2110 after performing any necessary fragmentation, forms a reply short message (RSM) to be sent. Here, the reply short message (RSM) to be sent would be as follows.

Send [UVW, RSM(1001, 8000, reply data)]

This reply short message is then sent to the mobile device A 2104 in accordance with a network protocol such as SMS via the SMSC 2106 and the carrier network 2108.

At the mobile device A 2104, upon receiving the reply short message, the reply short message is directed to the process associated with the port number "8000" (e.g., network browser). The process internal to the mobile device A 2104 then is able to receive and use the information that was requested from the network.

Thereafter, that process can send another request to the network. However, this time the destination port number is "1001" because the mobile device A 2104 remembers the source port number provided in the last reply message received. In this embodiment, the same agent-1 process 2116 or 2118 originally selected by the dispatcher process 2114 continues to be responsible for processing of messages from the same mobile device. Hence, subsequent requests would be directed directly to the appropriate agent process without use of the dispatcher process 2114. As an exemplary, the subsequent request messages could be of the following form.

Send [123, SM(8000, 1001, data)]

It should also be noted that the mobile devices of a communication system are initially provisioned by or via the network gateway such that they (1) understand what type network and what type protocols to use in communicating with the network gateway, and (2) know the port number associated with the dispatcher process (e.g., 1905) as well as the network address (e.g., 123) of the network gateway.

It should be noted that much of the processing described above with respect to FIGS. 14–19 is preferably implemented in an multi-threaded manner. As such, multiple operations can be performed concurrently for improved efficiency. Also, those skilled in the art should recognize that the decision blocks 15-2, 1506, 1602, 1702, 1802 and 1902 would be implemented by separate threads that wait to receive the associated items such that the processing resources of the multi-network gateway are not inefficiently used in constantly polling for the items.

Additional details on the design, construction and operation of network gateways and mobile devices are contain in (1) U.S. application Ser. No. 08/570,210, filed Dec. 11, 1995, and entitled "METHOD AND ARCHITECTURE FOR AN INTERACTIVE TWO-WAY DATA COMMUNICATION NETWORK"; (2) U.S. application Ser. No. 09/071,235, filed Apr. 30, 1998, and entitled "METHOD AND SYSTEM FOR INTEGRATING NARROWBAND AND WIDEBAND DATA TRANSPORTS"; and (3) U.S. application Ser. No. 09/071,216, filed Apr. 30, 1998, and entitled "METHOD AND APPARATUS FOR TRANSCODING CHARACTER SETS BETWEEN INTERNET HOSTS AND THIN CLIENT DEVICES OVER DATA NETWORKS"; each of these applications are hereby incorporated by reference in their entireties. Additional details concerning Internet protocols, namely, Hypertext Transfer Protocol (HTTP), can be found in Fielding et al., HTTP 1.1, Aug. 12, 1996, which is hereby incorporated by reference.

The advantages of the second aspect of the invention are numerous. One advantage of the invention is that each process within a gateway is able to be separately addressable. Another advantage of the invention is that messages are able to be routed between a process in a mobile device and a process in the gateway. At the gateway then, a message can be routed to the appropriate process within the gateway that is to process the message. Still another advantage of the invention is that a scaleable multiple network gateway supporting different wireless networks is facilitated by the improved ability to route messages. Yet another advantage of the invention is that it facilitates scaleable two-way communications over narrowband networks.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for routing messages to one of a plurality of addressable processes within a gateway that couples to a network, said method comprising the acts of:
    (a) receiving, at the gateway, a message from a mobile device, the message including a header portion and a data portion, the header portion including a destination port identifier and a source port identifier, the source port identifier identifies a port within the mobile device, and the destination port identifier identifies a port within the gateway;
    (b) obtaining the destination port identifier from the message; and
    (c) routing the message to a particular one of the addressable processes within the gateway that is associated with the port identified by the destination port number.

2. A method as recited in claim 1, wherein the gateway links a plurality of mobile devices to the network.

3. A method as recited in claim 1, wherein the message from the mobile device is transmitted from the mobile device to a message service center in a wireless manner, the message service center forwards the message to the gateway.

4. A method as recited in claim 3, wherein the message service center is a small message service center.

5. A method as recited in claim 1, wherein said routing (c) comprises:
    (c1) identifying a communication channel used within the gateway that corresponds to the destination port number; and
    (c2) thereafter routing the message to the particular one of the addressable processes within the gateway via the communication channel.

6. A method as recited in claim 5,
    wherein the gateway links a plurality of mobile devices to the network, and
    wherein the message from the mobile device is transmitted from the mobile device to a message service center in a wireless manner, the message service center forwards the message to the gateway.

7. A method as recited in claim 6, wherein the message service center is a small message service center.

8. A method as recited in claim 1, wherein said routing (c) comprises:
    (c1) looking up a communication channel in a route table that corresponds to the destination port number; and
    (c2) thereafter routing the message to the particular one of the addressable processes within the gateway via the communication channel.

9. A method as recited in claim 1, wherein mobile devices are able to communicate with the gateway through a plurality of different networks that use different protocols, and
    wherein said receiving (a) of the message at the gateway comprises: providing a plurality of protocol adapters at a central location within the gateway for receiving and transmitting messages over the plurality of different networks.

10. An apparatus that provides mobile devices with access to a network, said apparatus comprising:
    a plurality of addressable processes that process messages directed to the network, each of the messages including a destination port identifier, a source port identifier and a data portion, and for a particular message, the source port identifier identifies a port within a mobile device that sent the particular message to said apparatus and the destination port identifier identifies a port within said apparatus where the particular message is to be processed; and
    an internal message router for receiving incoming messages and routing the messages to said processes that are to process the messages, the routing being based on the destination port identifiers within the messages that identify the ports associated with said processes.

11. An apparatus as recited in claim 10, wherein said apparatus further comprises:
    a route table that associates communication channels with the ports within said apparatus, and
    wherein said internal message router operates to route each of the messages to the port associated with said process that is to process the incoming message by identifying a particular communication channel for the port indicated by the destination port identifier within the message, and then directing the message to said process associated with the port indicated by the destination port identifier via the particular communication channel.

12. An apparatus as recited in claim 10, wherein said apparatus is a proxy server.

13. An apparatus as recited in claim 10, wherein the network is the Internet.

14. An apparatus as recited in claim 10, wherein said processes interact with the network to obtain information requested from the network.

15. An apparatus as recited in claim 10, wherein said processes interact with the network to provide information from the network to the mobile devices.

16. An apparatus as recited in claim 10, wherein the mobile devices are selected from the group consisting of a mobile phone, a Personal Digital Assistant (PDA), and a portable computing device.

17. An apparatus as recited in claim 10,
    wherein said apparatus links a plurality of mobile devices to the network, and
    wherein the messages from the mobile devices are transmitted from the mobile devices to a plurality of message service centers in a wireless manner, the message service centers forward the messages to said internal message router of said apparatus.

18. An apparatus as recited in claim 17, wherein said internal message router comprises a plurality of protocol adapters that serve to adapt the messages for particular protocols with which the messages are to be sent to or received from the mobile devices via the message service centers.

19. An apparatus as recited in claim 18,
wherein said apparatus is a gateway between the network and a wireless communication system including the mobile devices, the wireless communication system utilizing a plurality of wireless network carriers, and
wherein said apparatus further comprises:
a HTTP interface module coupled to the network, said HTTP interface module interconnects said gateway with the network;
a push agent coupled to said HTTP interface module and including a network driver for each of the wireless network carriers, said push agent operates to receive notification messages for particular ones of the mobile devices, and to forwarded the notification messages to the particular ones of the mobile devices by the network driver associated with the wireless network carrier respectively used by the particular ones of the mobile devices; and
a pull agent coupled to said HTTP interface module and including a network driver for each of the wireless network carriers, said pull agent operates to receive information requests for information from the network from particular ones of the mobile devices, to form HTTP requests to request the information from the network via said HTTP interface module, to thereafter receive HTTP responses from the network containing the information requested, to form information replies for the particular ones of the mobile devices based on the HTTP responses, and then to send the information replies to the particular ones of the mobile devices as per the information requests using the network driver associated with the wireless network carrier respectively used by the particular ones of the mobile devices.

20. An apparatus as recited in claim 19, wherein said apparatus further comprises:
a configuration table, said configuration table containing information associating the mobile devices to the network drivers in said push agent and said pull agent.

21. A computer readable medium containing computer program code for routing messages to one of a plurality of addressable processes within an apparatus that couples to a network, said computer readable medium comprising:
computer program code for receiving at the apparatus a message from a mobile device, the message including a header portion and a data portion, the header portion including a destination port identifier and a source port identifier, the source port identifier identifies a port within the mobile device, and the destination port identifier identifies a port within the apparatus;
computer program code for obtaining the destination port identifier from the message; and
computer program code for routing the message to a particular one of the addressable processes within the apparatus that is associated with the port identified by the destination port number.

22. A computer readable medium as recited in claim 21, wherein said computer program code for routing comprises:

computer program code for identifying a communication channel used within the apparatus that corresponds to the destination port number; and
computer program code for thereafter routing the message to the particular one of the addressable processes within the apparatus via the communication channel.

23. A computer readable medium as recited in claim 21, wherein the apparatus is a gateway,
wherein the gateway links a plurality of mobile devices to the network, and
wherein the message from the mobile device is transmitted from the mobile device to a message service center in a wireless manner, the message service center forwards the message to the gateway.

24. A computer readable medium as recited in claim 23, wherein the message service center is a small message service center.

25. A computer readable medium as recited in claim 23, wherein said computer program code for routing comprises:
computer program code for looking up a communication channel in a route table that corresponds to the destination port number; and
computer program code for thereafter routing the message to the particular one of the addressable processes within the gateway via the communication channel.

26. A system for delivery of information from a network of computers to wireless communication devices, said system comprising:
a plurality of wireless communication devices, said wireless communications devices including a processing unit and a display screen;
a plurality of wireless network carriers, each of said wireless network carriers providing wireless communication services to said plurality of wireless communication devices, and a plurality of said wireless network carriers using a different combination of network type and transport protocol;
a network of computers, one or more of the computers of said network of computers contains information; and
a multi-network gateway, said multi-network gateway couples said wireless network carriers to said network of computers to facilitate data transfer therebetween, each of the plurality of said wireless network carriers using the different combination of network type and protocol are coupled to said network of computers by an airlink configured for the particular combination of network type and protocol, and each of the airlinks operate to exchange data with certain of said wireless communication devices via said wireless network carriers associated therewith, said multi-network gateway includes at least
a plurality of addressable processes that process messages directed to the network, each of the messages including a destination port identifier, a source port identifier and a data portion, and for a particular message, the source port identifier identifies a port within a wireless communication device that sent the particular message to said multi-network gateway and the destination port identifier identifies a particular one of said addressable processes within said multi-network gateway where the particular message is to be processed; and
an internal message router for receiving incoming messages and routing the messages to said addressable processes that are to process the messages, the routing being based on the destination port identifiers within the messages that identify the ports associated with said processes.

27. A system as recited in claim 26, wherein said wireless communication devices include one or more mobile phones.

28. A system as recited in claim 26, wherein said multi-network gateway further comprises:
- a pull agent, said pull agent operates to receive a request from a particular one of said wireless communication devices via a particular one of said plurality of wireless network carriers for information residing on said network of computers, then operates to formulate a network request for the information using a protocol associated with said network of computers and then sends the network request to said network of computers and awaits a network reply, and once the network reply is received, the network reply is converted to a device reply and then sends the device reply to the particular one of said wireless communication devices via the particular one of said plurality of wireless network carriers in accordance with a protocol associated with the particular one of said plurality of wireless network carriers.

29. A system as recited in claim 28, wherein said pull agent comprises at least one airlink for receiving the request from the particular one of said wireless communication devices and for sending the device reply to the particular one of said wireless communication devices via the particular one of said plurality of wireless network carriers in accordance with the protocol associated with the particular one of said plurality of wireless network carriers.

30. A system as recited in claim 29, wherein said pull agent comprises a plurality of airlinks, each of the airlinks being used for one of said plurality of wireless network carriers using the different combination of network type and protocol, and each of said airlinks operate to receive the request from the particular one of said wireless communication devices associated therewith and to send the device reply to the particular one of said wireless communication devices via the particular one of said plurality of wireless network carriers associated therewith in accordance with the protocol associated with the particular one of said plurality of wireless network carriers.

31. A system as recited in claim 30, wherein said multi-network gateway further comprises:
- a configuration table that stores information associating each of the plurality of said wireless network carriers with one of said airlinks.

32. A system as recited in claim 30, wherein said multi-network gateway further comprises:
- a push agent, said push agent operates to receive a notification request from said network of computers to be forwarded to a particular one of said plurality of wireless communication devices via a particular one of said wireless network carriers, then operates to formulate a device notification message, and then sends the device notification message to the particular one of said wireless communication devices via the particular one of said plurality of wireless network carriers in accordance with a protocol associated with the particular one of said plurality of wireless network carriers.

33. A system as recited in claim 32, wherein said push agent comprises a plurality of airlinks, each of the airlinks being used for one of said plurality of wireless network carriers using the different combination of network type and protocol, and each of said airlinks operate to send the device notification message to the particular one of said wireless communication devices via the particular one of said plurality of wireless network carriers associated therewith in accordance with the protocol associated with the particular one of said plurality of wireless network carriers.

34. A system as recited in claim 33, wherein said multi-network gateway further comprises:
- a configuration table that stores information associating each of the plurality of said wireless network carriers with one of said airlinks.

35. A system as recited in claim 33, wherein said push agent provides at least one narrowband communication channel between said network of computers and said wireless network carriers, and
- wherein said pull agent provides at least one wideband communication channel between said network of computers and said wireless network carriers.

36. A system as recited in claim 27, wherein one of said wireless network carriers is a CDPD type network, and another one of said wireless network carriers is a SMS type network.

37. A method for registering an addressable process with an internal message router of a network gateway within a communication system, the network gateway providing wireless communication devices with access to a network, said method comprising the acts of:
- (a) sending a registration request to the internal message router when an addressable process within the network gateway capable of being routed to by the internal message router is activated;
- (b) processing the registration request at the internal message router to assign a port number for the process; and
- (c) returning the assigned port number to the process.

38. A method as recited in claim 37, wherein the network gateway further includes a route table, and
- wherein said method further comprises: (d) adding an entry to the route table to associate the assigned port number to a communication channel used to communicated with the process.

39. A method as recited in claim 1, wherein the message is thereby routed to one of the processes within the gateway through use of the destination port number.

40. A method as recited in claim 1, wherein the ports within the gateway are logical ports.

41. A method as recited in claim 5, wherein the communication channel is a narrowband channel of a narrowband wireless network.

42. A computer readable medium as recited in claim 21, wherein the message is thereby routed to one of the addressable processes within the apparatus through use of the destination port number.

43. A computer readable medium as recited in claim 21, wherein the ports within the apparatus are logical ports.

44. A computer readable medium as recited in claim 22, wherein the communication channel is a narrowband channel of a narrowband wireless network.

45. A computer readable medium as recited in claim 44, wherein the apparatus is a gateway.

* * * * *